(12) United States Patent
De Ceulaer et al.

(10) Patent No.: US 6,993,727 B2
(45) Date of Patent: Jan. 31, 2006

(54) MHP TELEVISION DEVICE AND GUI APPLICATION

(75) Inventors: Luc De Ceulaer, Dilbeek (BE); Kazuto Mugura, London (GB); Andre Heugebaert, Chaumont-Gistoux (BE); Laurent Vaboquestal, Neder-Over-Hembeek (BE); Gert Copejans, Aartselaar (BE)

(73) Assignee: Sony Service Centre (Europe) N.V., Londerzeel (BE)

( * ) Notice: Subject to any disclaimer, the term of this patent is extended or adjusted under 35 U.S.C. 154(b) by 757 days.

(21) Appl. No.: 09/944,757

(22) Filed: Aug. 31, 2001

(65) Prior Publication Data

US 2002/0047860 A1    Apr. 25, 2002

(30) Foreign Application Priority Data

Sep. 4, 2000    (EP) .................................. 00307602

(51) Int. Cl.
*G06F 3/00*    (2006.01)
*G11B 27/00*    (2006.01)

(52) U.S. Cl. ...................... 715/843; 715/716; 715/768; 715/810; 715/840

(58) Field of Classification Search ................ 715/776, 715/777, 773, 808, 816, 827–831, 836, 716, 715/768, 810, 834, 840
See application file for complete search history.

(56) References Cited

U.S. PATENT DOCUMENTS

| | | | | |
|---|---|---|---|---|
| 5,808,608 A | * | 9/1998 | Young et al. | ................. 725/52 |
| 5,874,954 A | * | 2/1999 | Kilmer et al. | ............... 715/834 |
| 6,028,600 A | | 2/2000 | Rosin et al. | |
| 6,160,551 A | * | 12/2000 | Naughton et al. | .......... 715/769 |
| 6,275,268 B1 | * | 8/2001 | Ellis et al. | ................... 348/564 |
| 6,519,540 B1 | * | 2/2003 | Salandro | ..................... 702/68 |

FOREIGN PATENT DOCUMENTS

| | | |
|---|---|---|
| EP | 0 790 738 | 8/1997 |
| EP | 790738 A2 * | 8/1997 |
| GB | 2 333 215 | 7/1999 |

* cited by examiner

*Primary Examiner*—Ba Huynh
*Assistant Examiner*—Nhon D. Nguyen
(74) *Attorney, Agent, or Firm*—Frommer Lawrence & Haug LLP; William S. Frommer

(57) ABSTRACT

An MHP television device including a user input and a GUI application for use in such a device wherein the GUI application maintains at least one notional wheel to which activities and strings for representing the activities may be assigned and generates an image for display, the image including an edge of the notional wheel on which a predetermined number of the strings are arranged for display, the GUI application being responsive to the user input both to rotate the notional wheel so as to display different strings and to select any activity represented by a string on the notional wheel at a predetermined position of the image.

17 Claims, 21 Drawing Sheets

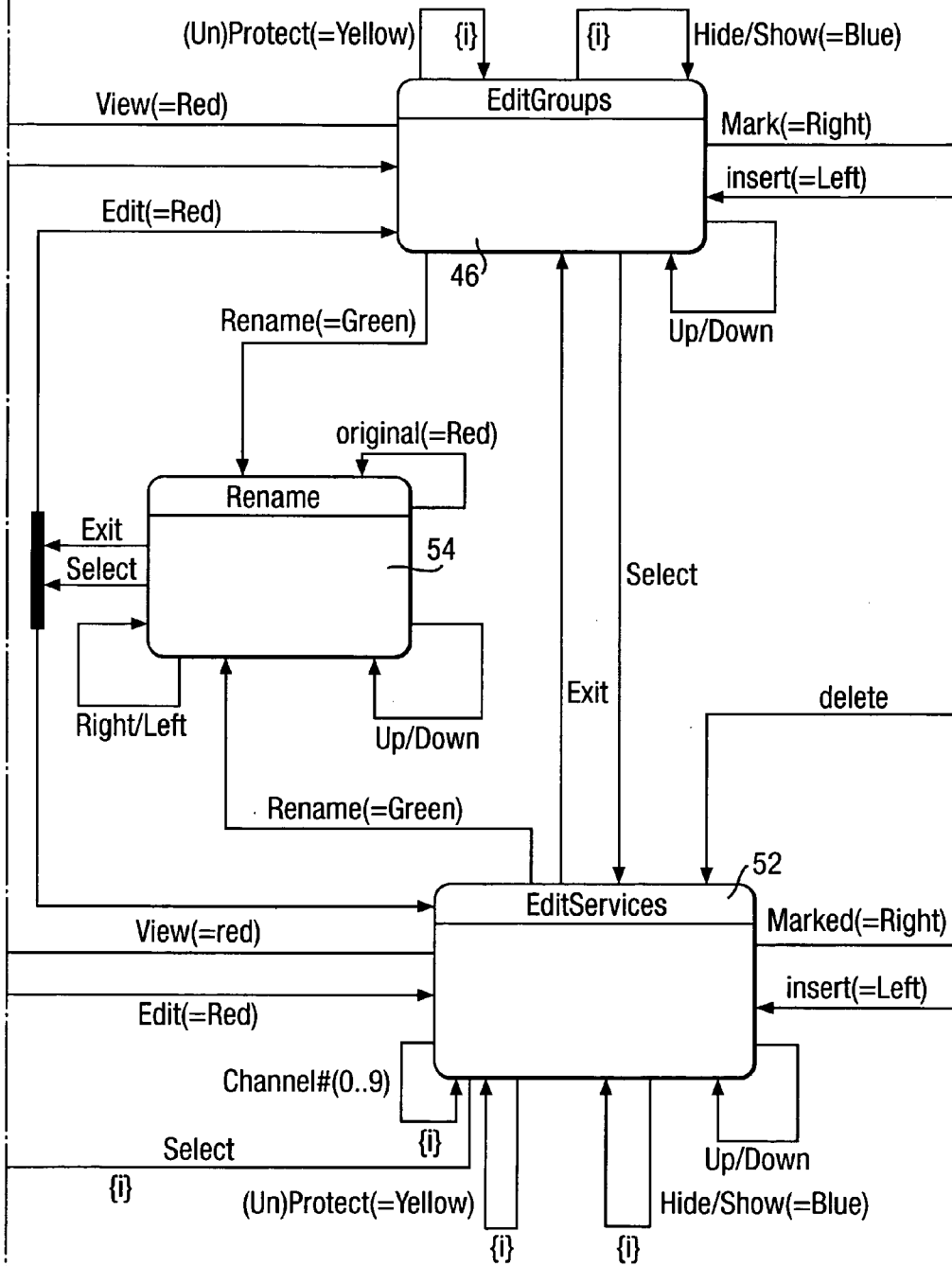

| Fig.12. | | |
|---|---|---|
| | Fig.12 (Con i). | Fig.12 (Con iii). |
| Fig.12. | Fig.12 (Con ii). | |

MHP TELEVISION DEVICE AND GUI APPLICATION

BACKGROUND OF THE INVENTION

1. Field of the Invention

The present invention relates to an MHP television device and GUI application, in particular, to an MHP television device incorporating a GUI application whereby a user may select activities represented by respective strings on the GUI.

2. Description of the Related Art

MHP television devices such as MHP set-top boxes and integrated television sets have now been developed. These devices are capable of receiving hundreds of broadcast services including television channels, applications etc. The MHP television devices are also capable of storing many internal applications. It therefore becomes a problem for the user to view all of these possible activities and select those required. Graphical user interfaces (GUIs) have been proposed which display representations of the activities as strings, for instance the names of the television channels or applications. These strings may be displayed in a tabular form which can be scrolled through by the user.

Because of the large number of activities available and, hence, the large number of strings to be displayed, this system is difficult for the user to use effectively.

It has also been proposed to display the activities in various groups called bouquets. Thus, a service provider may provide a list of all of the available sports channels such that the television device is able to display, as a bouquet, all of the sports channels. Although this reduces the number of activities presented to the user at any one time, where an individual bouquet refers to a large number of activities, it is still difficult for the user to find particular activities, such as channels or applications, of his or her choice. Furthermore, the user is forced to move between a number of different bouquets in order to find all of the activities falling within his or her personal taste.

OBJECTS OF THE INVENTION

Thus, it is an object of the present invention to provide a means of using an MHP television device which allows the preferred activities of a particular user to be identified and selected more easily.

SUMMARY OF THE INVENTION

According to the present invention, there is provided a method of providing an MHP television device including a user input with a graphical user interface comprising maintaining at least one notional wheel to which activities and strings for representing the activities may be assigned and generating an image for display, the image including an edge of the notional wheel on which a predetermined number of the strings are arranged for display, responsive to the user input, both rotating the notional wheel so as to display different strings and selecting any activity represented by a string on the notional wheel at a predetermined position of the image.

According to the present invention, there is also provided an MHP television device including a GUI application and a user input wherein the GUI application maintains at least one notional wheel to which activities and strings for representing the activities may be assigned and generates an image for display, the image including an edge of the notional wheel on which a predetermined number of the strings are arranged for display, the GUI application being responsive to the user input both to rotate the notional wheel so as to display different strings and to select any activity represented by a string on the notional wheel at a predetermined position of the image.

According to the present invention, there is provided a GUI application for use with an MHP television device and a user input wherein the GUI application maintains at least one notional wheel to which activities and strings for representing the activities may be assigned and generates an image for display, the image including an edge of the notional wheel on which a predetermined number of the strings are arranged for display, the GUI application being responsive to the user input both to rotate the notional wheel so as to display different strings and to select any activity represented by a string on the notional wheel at a predetermined position of the image.

In this way, the user is provided with a means for selecting individual activities from a large number of activities whilst only requiring very simple controls of the graphical user interface. This is particularly advantageous as an implementation of a GUI application with an MHP television device, since the user is able to control complex selections within the MHP television device by means of an easy to use graphical user interface implemented as the GUI application on the MHP layer of the MHP television device.

Preferably, the MHP television device comprises one of a set top box and an integrated television.

The GUI application may store activities and their respective strings in groups, the strings of each group being assigned to a respective notional wheel and being available for display on the edge of the respective notional wheel and the activities may include groups, such that selection of a group causes the GUI application to generate an image including the edge of a notional wheel with the strings of the selected group.

This enables a very large number of activities to be accessed by the user in a simple and logical manner. The activities can be arranged in to the various groups according to category such that a user may find a desired activity by looking in the group or bouquet of the appropriate category.

The activities may include television channels and the image may include a portion adjacent the predetermined position for displaying an internally assigned channel number corresponding to the channel currently represented by the string at the predetermined position.

In this way, where a user knows the channel number of a desired channel, he or she may access that channel directly by entering the channel number. By displaying the channel number with the wheel, a user may become familiar with the various channel numbers.

The image may include function areas corresponding to predetermined functions, the GUI application being responsive to the user input to initiate the functions.

In this way, many different additional functions may be provided whilst still allowing access to those functions with a limited user input, for instance having only a few input keys.

Responsive to selection of an edit function, the GUI application may generate an edit image including the edge of a notional wheel.

Thus, it is possible to allow the user to edit the groups and activities displayed by means of the notional wheels.

The edit image may include a hide function area and the GUI application may be responsive to the hide function such that the string currently at the predetermined position is hidden or unhidden from display.

In this way, a user may reduce the number of activities normally presented and thereby facilitate selection of activities. In particular, where certain activities will never be required by a particular user, they may be hidden from view such that the total number of activities presented on the wheel in question will be reduced.

The edit image may include a lock function area and the GUI application may be responsive to the lock function such that the activity represented by the string currently at the predetermined position is made available or unavailable for selection.

In this way, a user may prevent particular activities from being selected, for instance to prevent children watching unsuitable television channels. In order to allow selection of those channels, the GUI application may require entry of some code, for instance a previously determined identification number.

The edit image may include a re-name function area and the GUI application may be responsive to the re-name function to generate a re-name image for display, the image including the edge of a notional wheel on which the string at the predetermined position of the notional wheel of the edit image is retained at the predetermined position and characters appear at other positions of the notional wheel, the GUI application being responsive to the user input both to rotate the notional wheel and move the string within the predetermined position such that each character of the string can be changed in turn by rotating the notional wheel.

In this way, a user can rename activities without the need of a keyboard or other complex user input. This is particularly useful, since the edit mode allows a user to define his or her own groups or bouquets and these can be named as appropriate. Similarly, particular channels or other activities may be given names which seem more suitable to a particular user.

Responsive to the user input, the GUI application may move the string at the predetermined position to a temporary position so as to leave a space at the predetermined position or move the string from the temporary position to the predetermined position, rotation of the notional wheel maintaining the space at the predetermined position such that a string is moved out of one position on the notional wheel and back in to a different position.

In this way, a user can reorder strings within a particular wheel. Thus, the order of the activities within a particular wheel can be changed to suit a particular user. This provides a significant advantage over previous displays which order items in a fixed manner.

Preferably, when a string is at the temporary position, the GUI application causes a copy function area to be displayed on the edit image and, responsive to selection of the copy function, the GUI application allows selection of other notional wheels, each with a space at the predetermined position, thereby allowing the insertion of the string from the temporary position into the other notional wheels.

In this way, a user is able to move activities between groups and bouquets. This is particularly advantageous, since it allows a user to provide custom groups or bouquets to suit his or her own particular requirements.

Responsive to selection of a scan function, the GUI application may generate a scan image including the edge of a notional wheel and a start function area, the GUI application being responsive to the start function area to initiate scanning of all available activities and to assign all of the detected activities and their respective strings to the notional wheel.

In this way, it is not necessary for the MHP television device to be loaded separately with details of the available activities. Similarly, it is not necessary for the user to input these details. Indeed, for any new location of the MHP television device, it is possible to use the scan function to determine all of the available activities. Similarly, it is possible periodically to scan the available activities to determine that all are included within the wheels of the device.

Preferably, the GUI application only conducts a repaint operation to update an image for display upon receipt of an appropriate trigger, the GUI application then determining which part of the image requires an update and conducting a repaint operation for that part.

Since the available memory and processing in an MHP television device can be limited, this is a significant feature in maximising the use of the available resources. In particular, resources are not wasted by regularly repainting the images, since the GUI application only initiates repainting of parts of the image as and when necessary.

Preferably, the GUI application comprises a wheel data object for maintaining a list of activities in relation to the notional wheels and a string wheel object for providing data representing the displayed edge of the current notional wheel.

In this way, the data required for the various wheels can be maintained and manipulated in an efficient manner and can be implemented on the MHP platform.

Preferably, the GUI application further comprises a main pane object responsive to the user input and an animator object wherein, responsive to the user input to rotate a notional wheel, the main pane creates an animation object for rotating the wheel and the animator object controls the animation object to change the data of the string wheel object on the basis of the data in the wheel data object.

In this way, animations are corrected as and when necessary such that the resources are used more efficiently. Indeed, other animation objects can be created according to the other changes in display as described above.

Preferably, each time the animator object controls the animation object to conduct a process to produce the next frame, the process returns the time to wait for the animation object to produce the following frame such that when a predetermined number of animations have been conducted for rotating the notional wheel, the animation object conducts a process to align the wheel relative to the redetermined position.

In this way, irrespective of the individual steps of the animation, it is ensured that at the end, the displayed image includes the wheel at the correctly aligned position.

DETAILED DESCRIPTION OF THE PREFERRED EMBODIMENTS

The invention will be more clearly understood from the following description, given by way of example only, with reference to the accompanying drawings.

Figure 1:
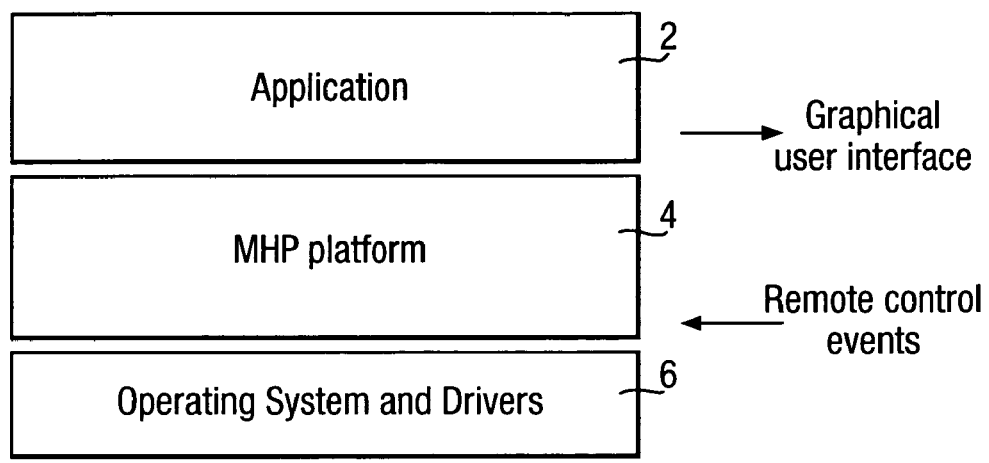
FIG. 1 illustrates the layered structure of the GUI application.

The present invention relates to MHP television devices such as MHP set-top boxes and integrated television sets. As illustrated by FIG. 1, these devices are constructed such that various applications 2 may be run on the MHP platform layer 4, itself above the operating system and drivers layer 6. In this way, applications may run on a variety of different television devices having different operating systems and drivers, but all running on the MHP platform. In particular, the MHP platform allows the use of JAVA applications.

The present invention is particularly concerned with a GUI application for use on the MHP platform. It is used with a MHP television device to drive a display to show the required graphical user interface. Remote control events, such as activation of various buttons on a remote control device, are monitored by the MHP televison device and corresponding signals are passed to the GUI application.

Before considering the detail of a preferred embodiment of the GUI application itself, a preferred embodiment of the GUI as presented to the user will be described.

Figure 2:
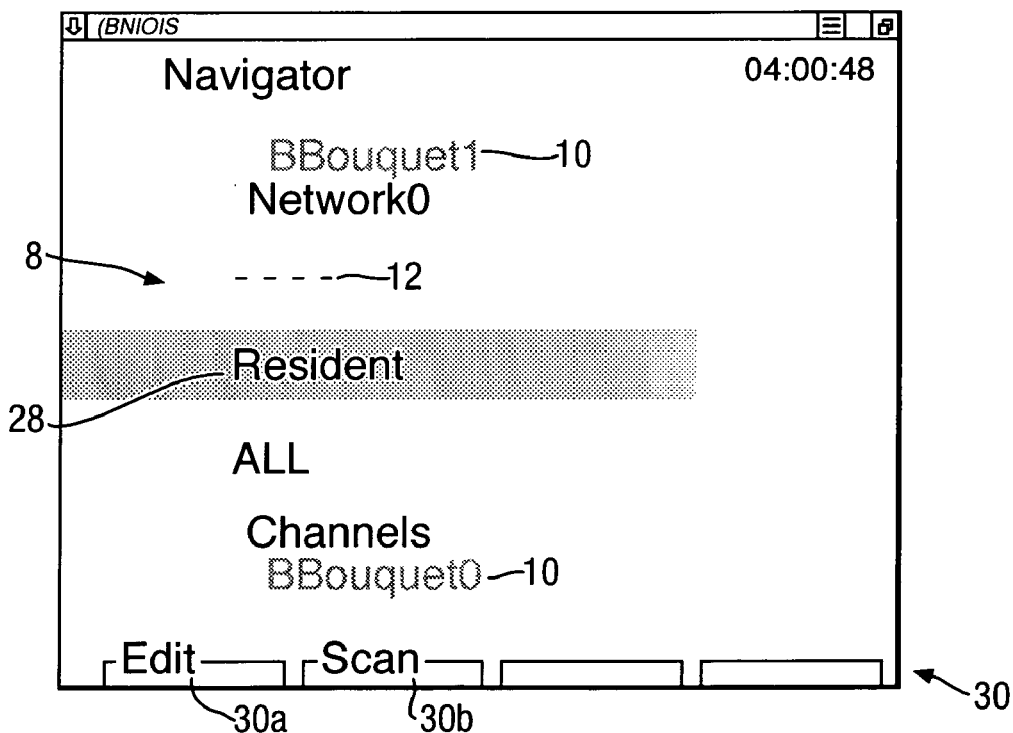
FIG. 2 illustrates the navigator image for groups of activities.

In the preferred embodiment, the user is first provided with a main screen as illustrated in FIG. 2 and described as the Navigator. This displays a selection of groups or bouquets of activities, such as channels or applications.

Figure 3:
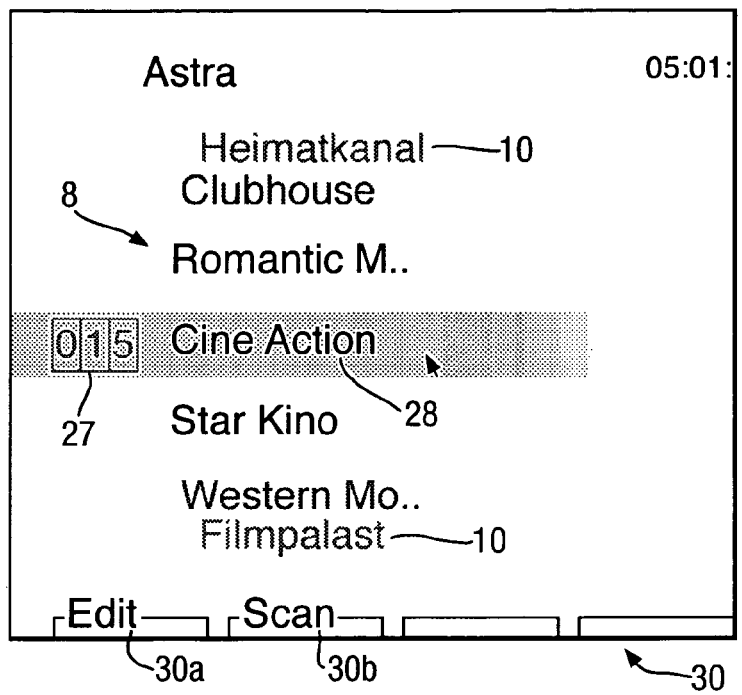
FIG. 3 illustrates the navigator image for channels.

When one of the groups or bouquets is selected, the GUI then displays the activities available within that selected group. FIG. 3 illustrates channels which may be selected from one of the groups indicated on the main page, in particular, the group "Astra".

As illustrated in FIGS. 2 and 3, strings representing the various activities, whether they be groups, bouquets, channels or applications, are displayed on the screen as if they are on the edge of a wheel 8. Preferably, the strings always remain vertical and, hence, appear as if they are hung around the wheel 8 in the manner of a fairground "big-wheel". To enhance the appearance of the wheel 8, it is viewed slightly from one side and the strings 10 are faded in appearance for positions further back around the wheel.

Although any number of activities may be available for any particular set, whether that be the set of groups and bouquets or individual sets of channels and applications, only a predetermined number of the available activities are displayed at any one time. Thus, in the illustrated embodiment, the notional wheel 8 includes only seven strings at its edge. If it happens that a particular set includes less than the predetermined number, it is proposed to leave a space, such as space 12, in the displayed edge of the wheel 8.

Figure 4:
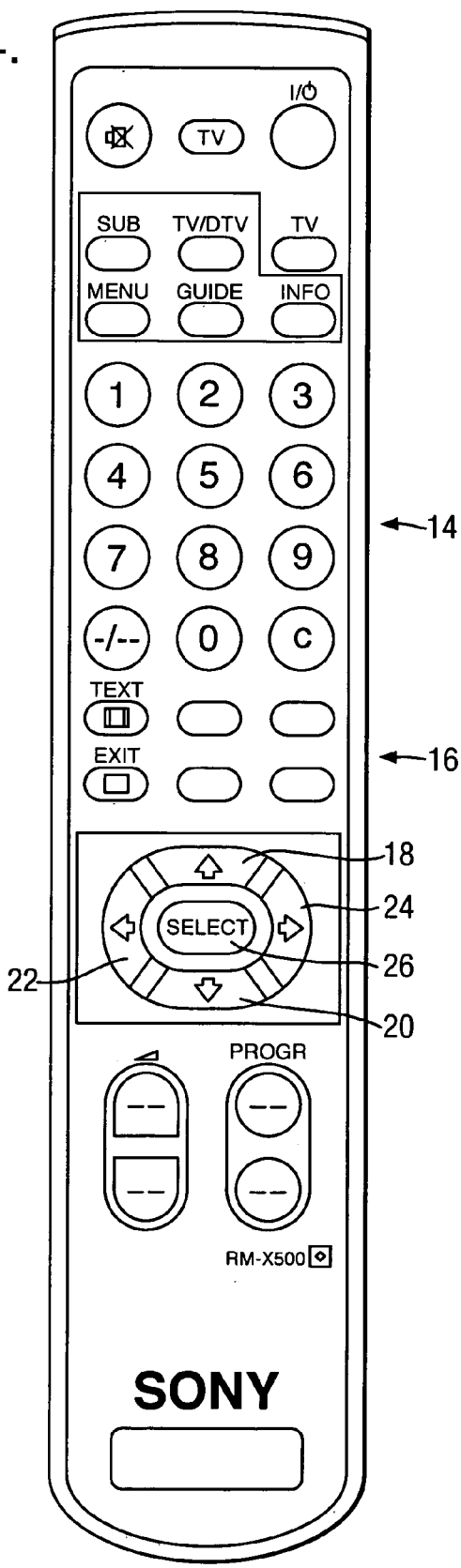
FIG. 4 illustrates a user input.

In the preferred embodiment, it is proposed to operate the GUI by means of a remote control device similar to that illustrated in FIG. 4. This includes a numeric keypad 14, blue, yellow, red and green function keys 16 (also known as soft keys), up and down keys 18, 20, left and right keys 22 and 24 and a select key 26. However, any other input device allowing input for the functions described below could also be used. For instance, rotary buttons such as jog dials as used on mobile phones could be used.

With reference to FIGS. 2 and 3, actuation of up and down keys 18, 20 cause the GUI to rotate the notional wheel 8 either up or down. In a preferred embodiment, actuating of one of those keys in quick succession causes the wheel 8 to rotate continuously until a key is pressed again.

One of the positions of the strings is considered as a predetermined position 28 allowing selection of the activity represented by that string. In the illustrated embodiment, the predetermined position 28 is that most forward on the wheel 8 and central of all the strings displayed.

Thus, by rotating the wheel 8, it is possible to move sequentially all of the strings to the predetermined position 28 and, hence, it is possible to select any of the activities represented by the strings, for instance by using the select key 26. Where the number of available activities in a particular set is equal to the predetermined number of strings displayed on the edge of the wheel 8, then rotation of the wheel 8 will cause a string moving out of view at one end of the wheel 8 to reappear in view at the other end of the wheel 8. However, as mentioned, the number of activities in a set is potentially unlimited. Thus, for higher numbers of activities and strings in a set, rotation of the wheel 8 causes the GUI to move each of the strings in turn to the predetermined position 28 in a circular manner while displaying only the predetermined number of strings at any one time.

According to a preferred embodiment, an area of the screen, for instance, the top right section of the displays illustrated in the Figures, is intended for displaying broadcast services. In this respect, it is possible for the GUI application to interact with the MHP platform so as to control the tuner of the television device to provide for display the broadcast service identified by the string at the predetermined position 28. For instance, this might occur after the wheel 8 has not been rotated for a predetermined period.

FIG. 2 illustrates examples of the types of group or bouquet that can be displayed and selected. For instance, "Resident" might contain all of the internal applications available to the television device, "ALL" would probably contain a list of all activities available to the television device, "Channels" might contain a complete list of all the television channels available to the television device (for instance in the order of the channel numbers assigned internally to the channels), "network0" might contain all of the broadcast services available from that network and "bbouquet0" and "bbouquet 1" might contain respectively different types of broadcast service.

As illustrated in FIG. 3, the GUI could also display the internally assigned channel number 27 of the string at the predetermined position 28. If a user is familiar with these numbers, he or she might merely use the keypad 14 to select a particular channel.

Furthermore, a predetermined icon can be displayed adjacent strings which have been marked as "favourites" by the user, for instance by placing them in a favourites bouquet in a manner to be described below.

Figure 5:
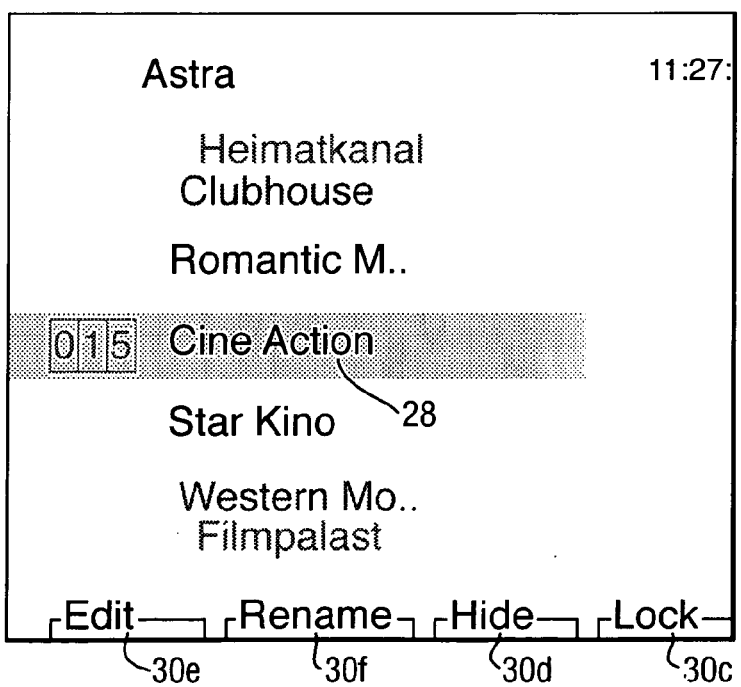
FIG. 5 illustrates an edit image.

It is proposed that the GUI should enable the strings to be edited. Hence, the GUI can preferably display an edit screen also to be described as an Organiser. Such a display is illustrated in FIG. 5.

Any convenient way of moving from the Navigator to the Organiser is acceptable. However, according to the preferred embodiment, use is made of the coloured function keys or soft keys 16. These correspond to coloured display areas 30 at the bottom of the display screen.

Thus, as illustrated in FIGS. 2 and 3, the far left coloured display area 30a corresponds to an edit function. Upon actuation of the corresponding coloured function key 16, the GUI replaces the Navigator screen with an Organiser screen as illustrated in FIG. 5.

The Organiser screen displays the same set of strings as previously displayed on the corresponding Navigator screen. However, the coloured function areas 30 take on different functions which are activated by actuation of the corresponding coloured function key 16. These functions operate on the activity represented by the string in the predetermined position 28.

The lock function 30c puts a lock on that particular activity and prevents it from being used by the television device without additional authorisation, for instance, by entering a pin-code. The same function area 30c and key 16 may be used to unlock activities. Also, an icon, such as a padlock, may be displayed next to the string when the activity is locked. Indeed, this may be displayed additionally on the Navigator screen, for instance appearing only when the string appears in the predetermined position.

The hide function 30d may operate to hide the string from view when in the Navigator screen. For instance, when a bouquet of broadcast services includes certain services which a particular user never wishes to access, he or she can hide those services from the display of that bouquet, thereby facilitating selection of the services in which he or she is interested. The hide function 30d may also be used to unhide previously hidden strings. For this operation, it is proposed that the Organiser screen always displays all strings in a particular set, but marks hidden strings with a special icon. As with the lock icon, this icon might only appear when a string is positioned at the predetermined position 28.

The view function 30e merely moves back to the Navigator Screen.

Figure 6:
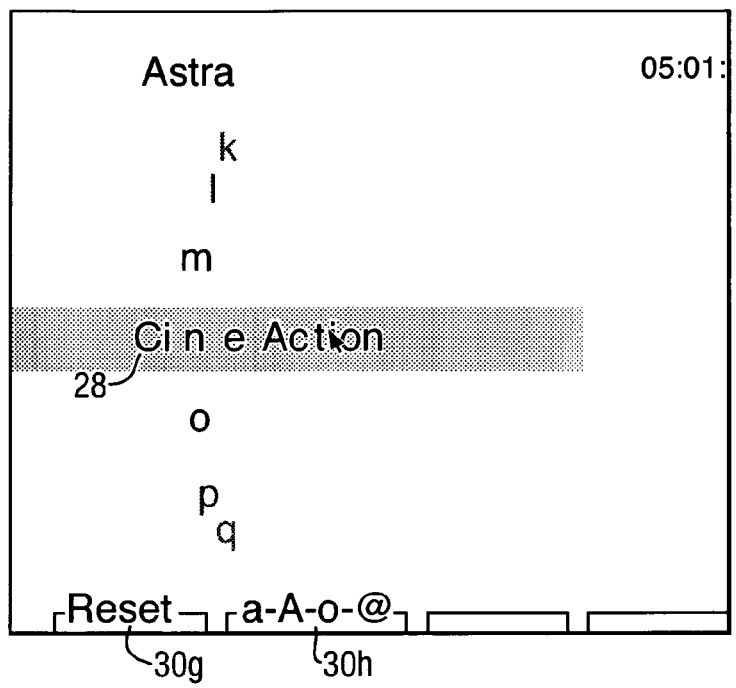
FIG. 6 illustrates a rename image.

When the rename function 30f is selected, the edit screen is replaced by the GUI with a rename screen such as illustrated in FIG. 6.

The string previously in the predetermined position 28 is maintained there. However, the set of strings previously displayed on the notional wheel 8 are replaced by a predetermined set of characters, normally alphabetic characters. By rotating the wheel 8 up or down and by moving the string left or right, it is possible to change all of the characters within the string.

As illustrated, the coloured function areas 30 allow selection of two further functions. In particular, a reset function 30g is provided to return the string to its original form before the renaming steps were taken. In addition, a character selection function 30h allows different sets of characters to be placed on the notional wheel, for instance a set of lower case characters, a set of upper case characters, special characters etc.

Returning to FIG. 5 and considering the Organiser screen, it is proposed to be able to move the selected string, namely that in the predetermined position 28, out of the wheel 8 and into a temporary position 32. In the illustrated embodiment, it is proposed to slide the string out of wheel to the right. This may achieved by using the right key 24 or any other suitable user input.

Figure 7:
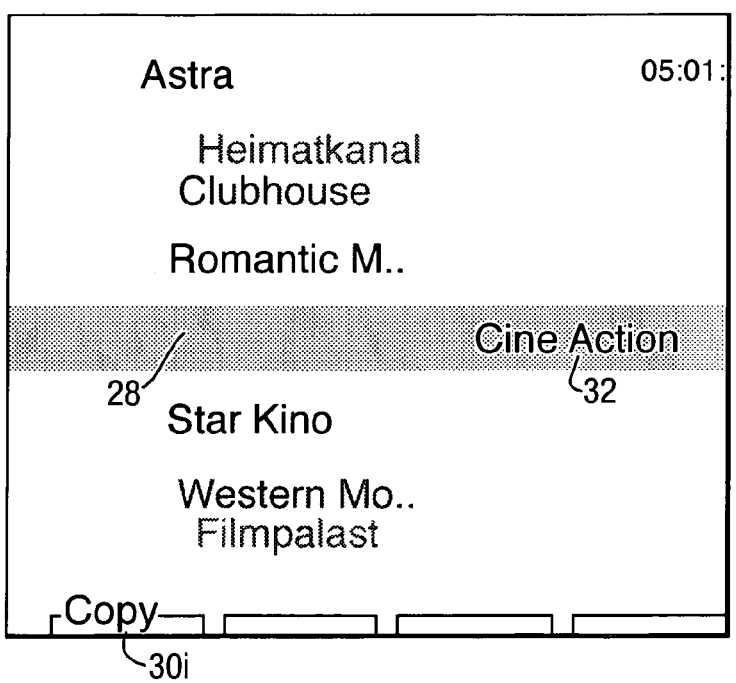
FIG. 7 illustrates an edit image.

Thus, as illustrated in FIG. 7, a space is then left in the wheel 8. In this mode, rotation of the wheel 8 will cause strings to rotate twice as fast over the predetermined position 28 so as to maintain the space in the predetermined position 28. Thus, effectively, the space in the circular array of strings is moved sequentially around the array. When the appropriate place is found, the string in the temporary position 32 may be moved back into the predetermined position 28, for instance by means of the left key 22. In this way, the Organiser may be used to reorder the strings within a set.

Referring to FIG. 7, it will be seen that when a string is moved from the predetermined position 28 to the temporary position 32, the functions of the coloured function areas 30 are changed. In particular, a "copy" function 30i becomes available. If the copy function 30i is selected, the Organiser returns to a display similar to FIG. 2 showing all of the groups or bouquets on the wheel 8. By rotating the wheel 8 in the normal way such that the desired group or bouquet appears in the predetermined position 28, it is possible to select that group or bouquet as the target into which to copy the string from the temporary position 32.

Having selected the target group or bouquet, the Organiser then displays on the wheel 8 the strings in the set making up that particular group or bouquet. However, because the string exists in the temporary position 32, no string is displayed in the predetermined position 28. As described previously, rotation of the wheel 8 causes strings to move twice as fast over the predetermined position 28 so as it to maintain it empty. When an appropriate position has been selected for the string in the temporary position 32, it may be moved onto the wheel 8, for instance using left key 22 as described above.

In this way, the Organiser may be used to move strings not only within a group or bouquet, but also from one group or bouquet to another group or bouquet.

Returning to FIGS. 2 and 3, it will be seen that one of the coloured function areas 30 represents a scan function 30b.

Figure 8:
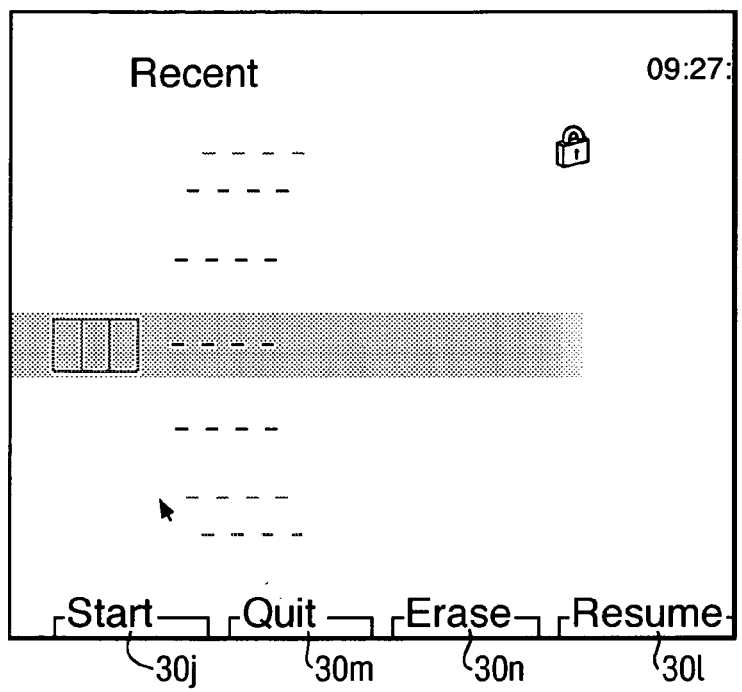
FIGS. 8 and 9 illustrate images during a scanning process.

By selecting this function, the GUI moves to a display as illustrated in FIG. 8. By means of this display, the GUI enables control of an additional application on the MHP platform for scanning all available channels to determine their content.

Figure 9:
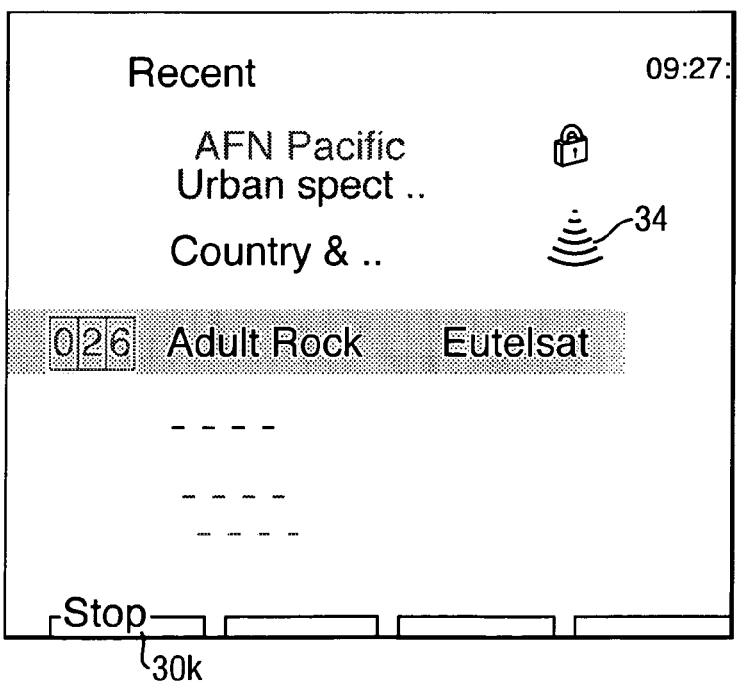

When the start function 30j is selected from the coloured function areas 30, the GUI moves to the display illustrated in FIG. 9.

In this display, the wheel 8 rotates filling up with all the broadcast services detected by the scanning application. In particular, the scanning application receives a particular channel, identifies the broadcast service and produces an appropriate string for the wheel 8. It then moves on to the next channel. To produce the string, the string is typically extracted from the SI tables available in the broadcast stream. Sometimes, when there is no valid name available a local representation string is used which may or may not make sense. Currently, the "dvb locator" is used which may be of the form "dvb://<networkID>.<sreamID>.<serviceID>" so it may look like "dvb://1.54.364" for example.

In a preferred embodiment, an animation 34 is provided to illustrate reception of the broadcast services during scanning. In the illustrated embodiment, the name of the broadcast service provider is also displayed.

As illustrated, the scanning function can be stopped by selecting the stop function 30k from the coloured function areas 30.

In one preferred embodiment, it is also possible to provide a resume function 301 as illustrated in FIG. 8. This may be useful to users, since scanning all of the available channels may take some considerable time.

As illustrated in FIG. 8, quit and erase functions 30m, 30n are also provided such that a user may quit the scanning process or may delete all of the previously identified broadcast services from the device.

As mentioned above, the GUI application is implemented as an application for the MHP platform.

Figure 10A:
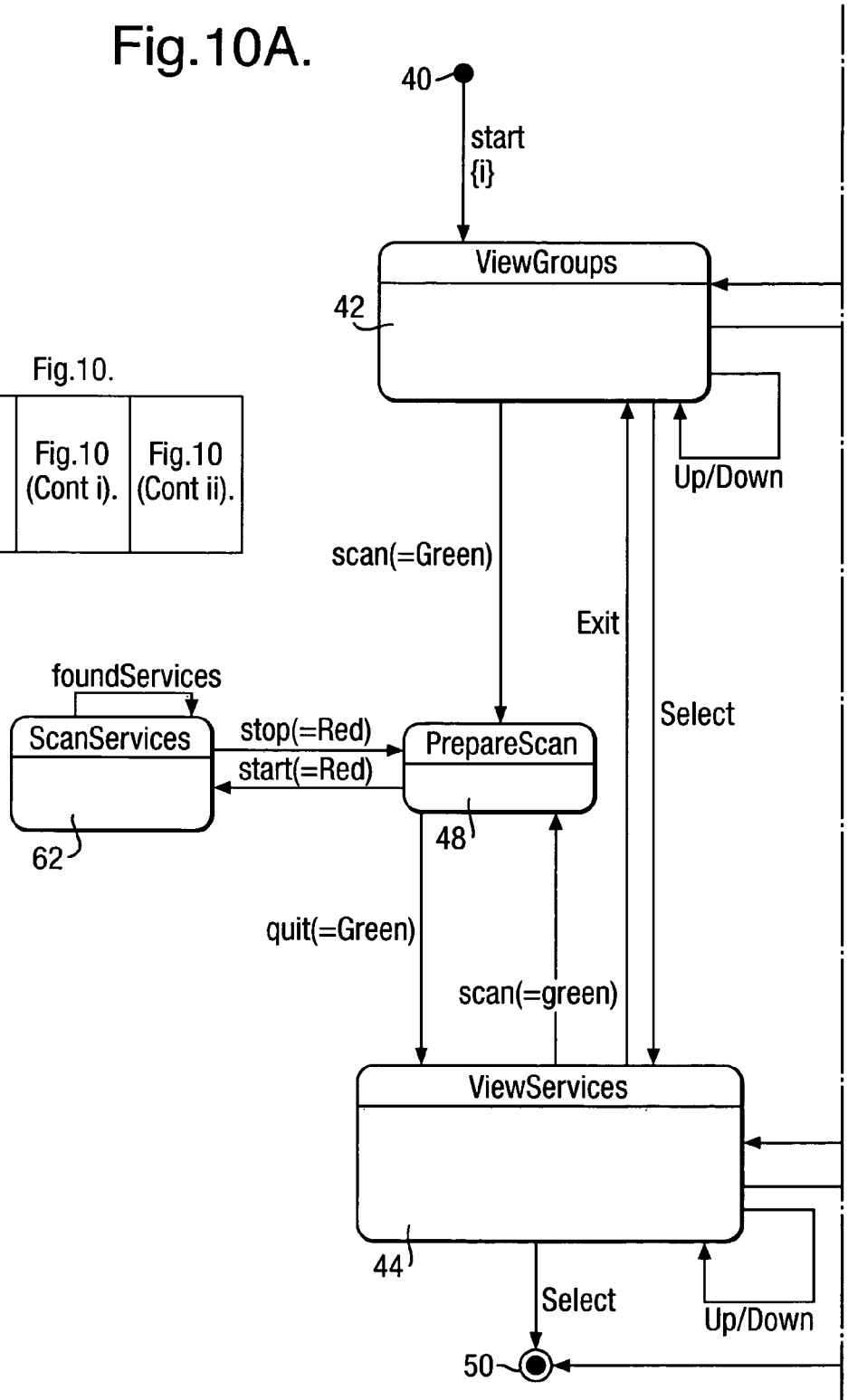
FIG. 10 illustrates a state diagram for an embodiment of the present invention.
Figure 10C:
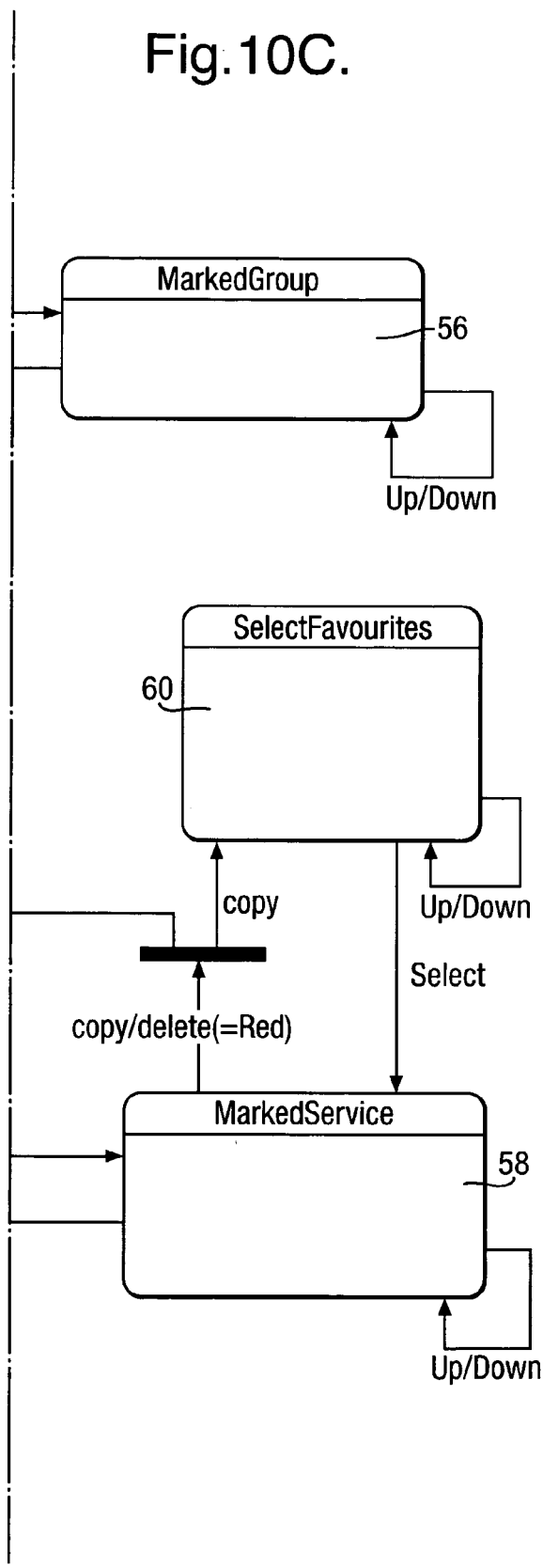

FIG. 10 illustrates the state diagram for the overall GUI application.

From the start 40, the GUI application proceeds to the view groups state 42 as described with reference to FIG. 2. In this state, the wheel 8 may be moved up or down or the GUI application may change states to the view services state 44 illustrated in FIG. 3, the edit groups state 46 as illustrated in FIG. 5 or the prepare scan state 48 as illustrated FIG. 8.

From the view services state 44, the GUI application may move the wheel 8 up or down. It may also move to selecting a particular service 50 or move to the edit services state 52.

In both the edit group state 46 and the edit services state 52, it is possible to move the wheel 8 up and down, hide/show strings and lock or protect strings. From both of these states it is also possible to move to the rename state 54.

From the edit group state 46, it is possible to move to the marked group state 56 and from the edit services state 52, it is possible to move to the marked service state 58.

Groups and services (e.g. channels, applications etc.) are "marked" when they are moved out of the wheel in which they were found. A gap is formed in the wheel and the user is forced to do something with the marked item such as move it, copy it or even delete it.

In the rename state 54, it is possible to move the string left or right and move the wheel up or down.

From the marked service state 58, it is possible to move to the select favourites state 60.

From the prepare scan state 48, it is possible to move to the scan services state 62.

Other functions will also be apparent from the state diagram of FIG. 10.

In order to explain the implementation of the GUI application, reference will be made to a series of sequence diagrams.

To maintain an image on the display, it is proposed to use three layered planes, in particular the background, video and graphics planes. In this respect, to reduce processing and memory requirements, the GUI application uses a constant background. Thus, the screen always shows the four coloured function areas and appropriate text is positioned over these areas as and when necessary. Additionally, in order to reduce processing and memory requirements, the graphics are only updated when a change occurs and, furthermore, only that part of the graphics which has changed is repainted.

Figure 11:
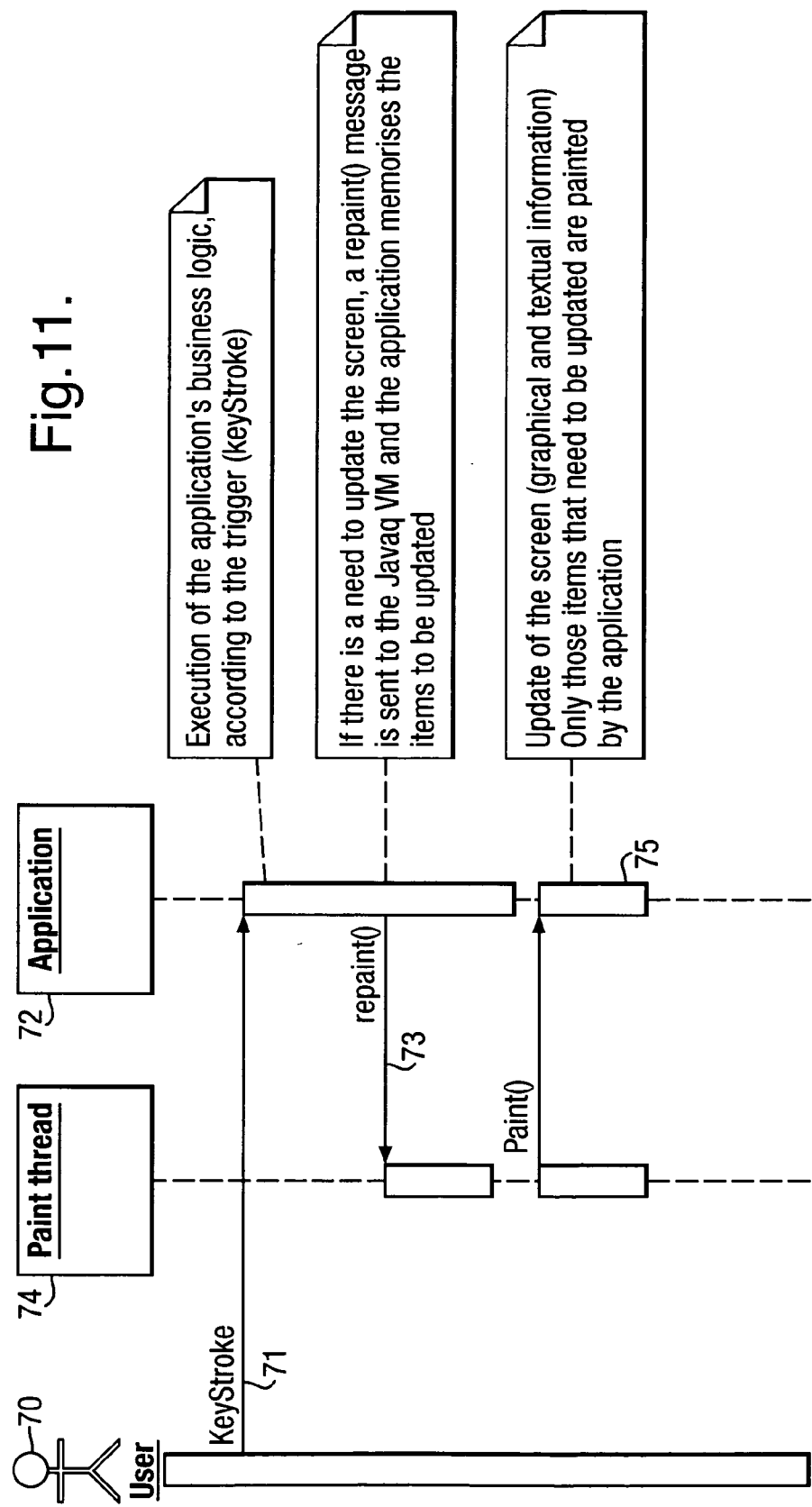
FIG. 11 illustrates a sequence diagram for a repaint process.
Figure 12A:
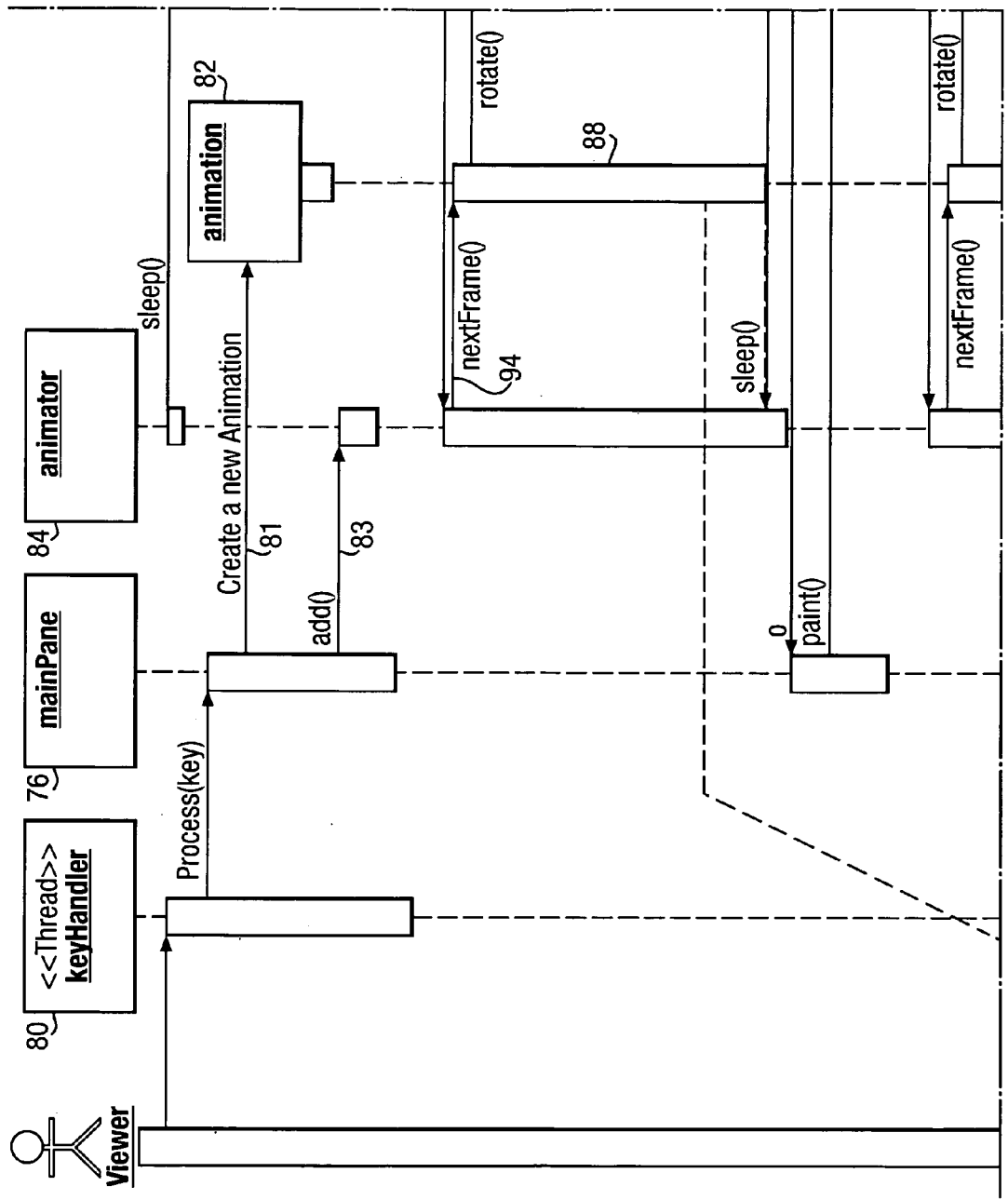
FIG. 12 illustrates a sequence diagram for rotation of a notional wheel.
Figure 12B:
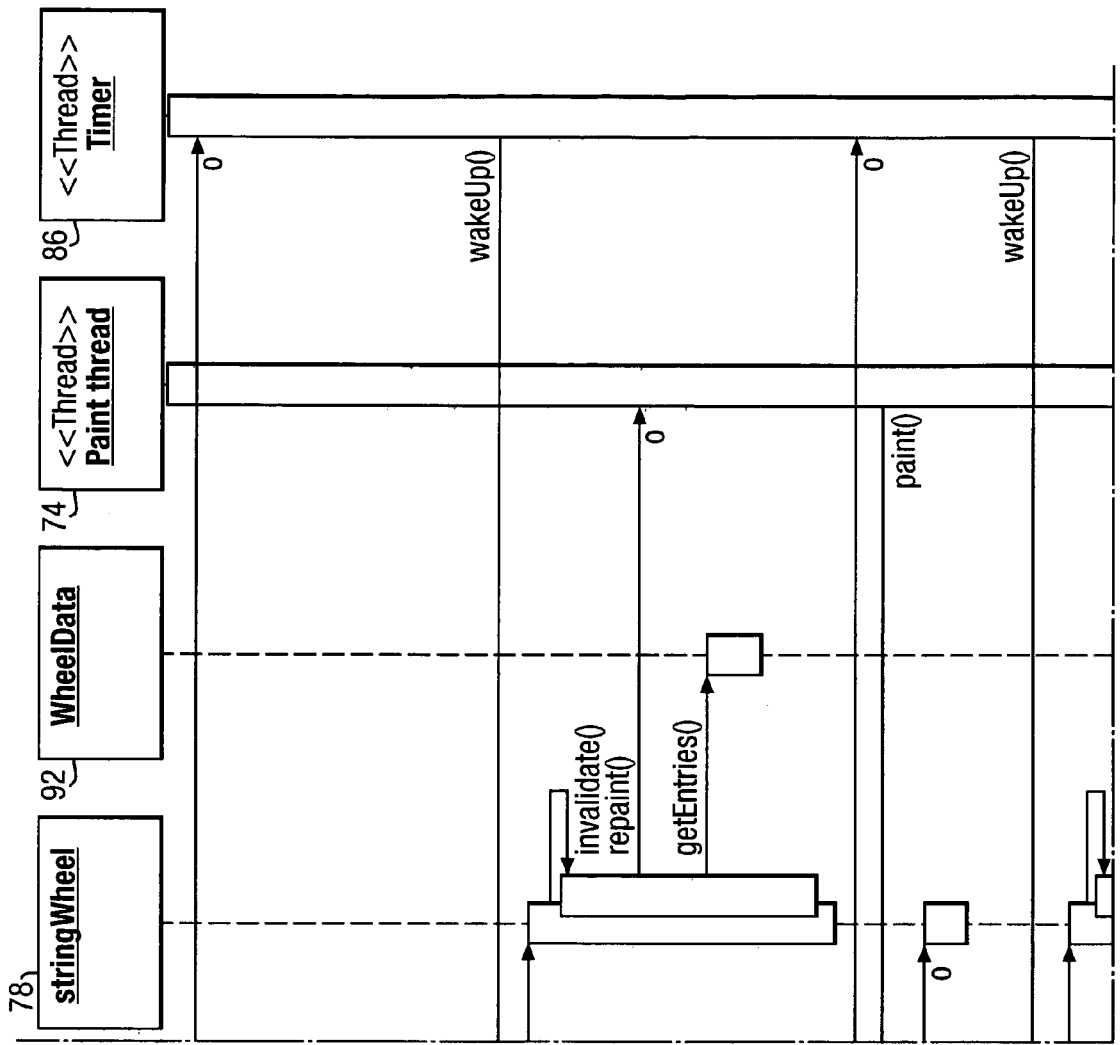
Figure 12C:
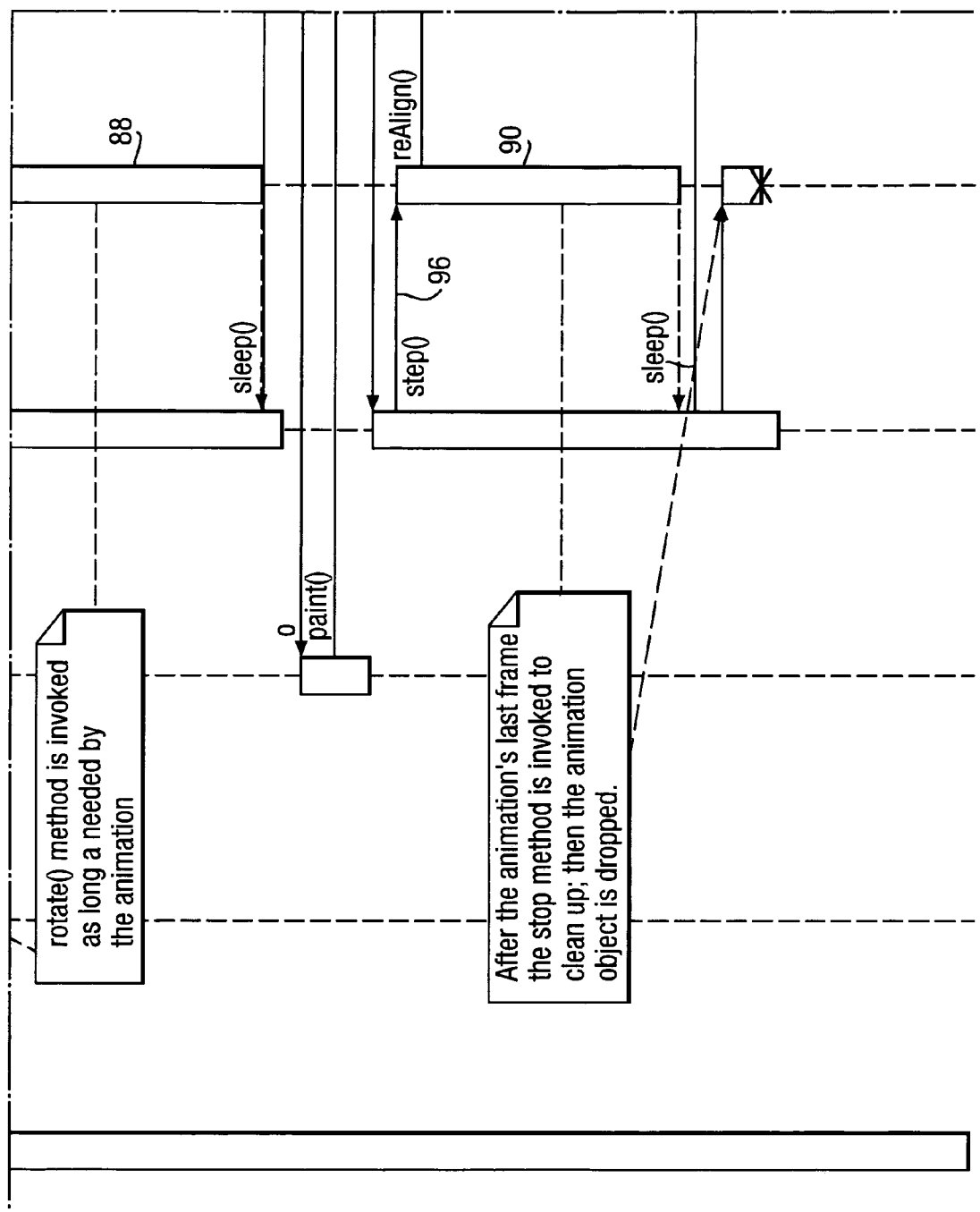
Figure 12D:
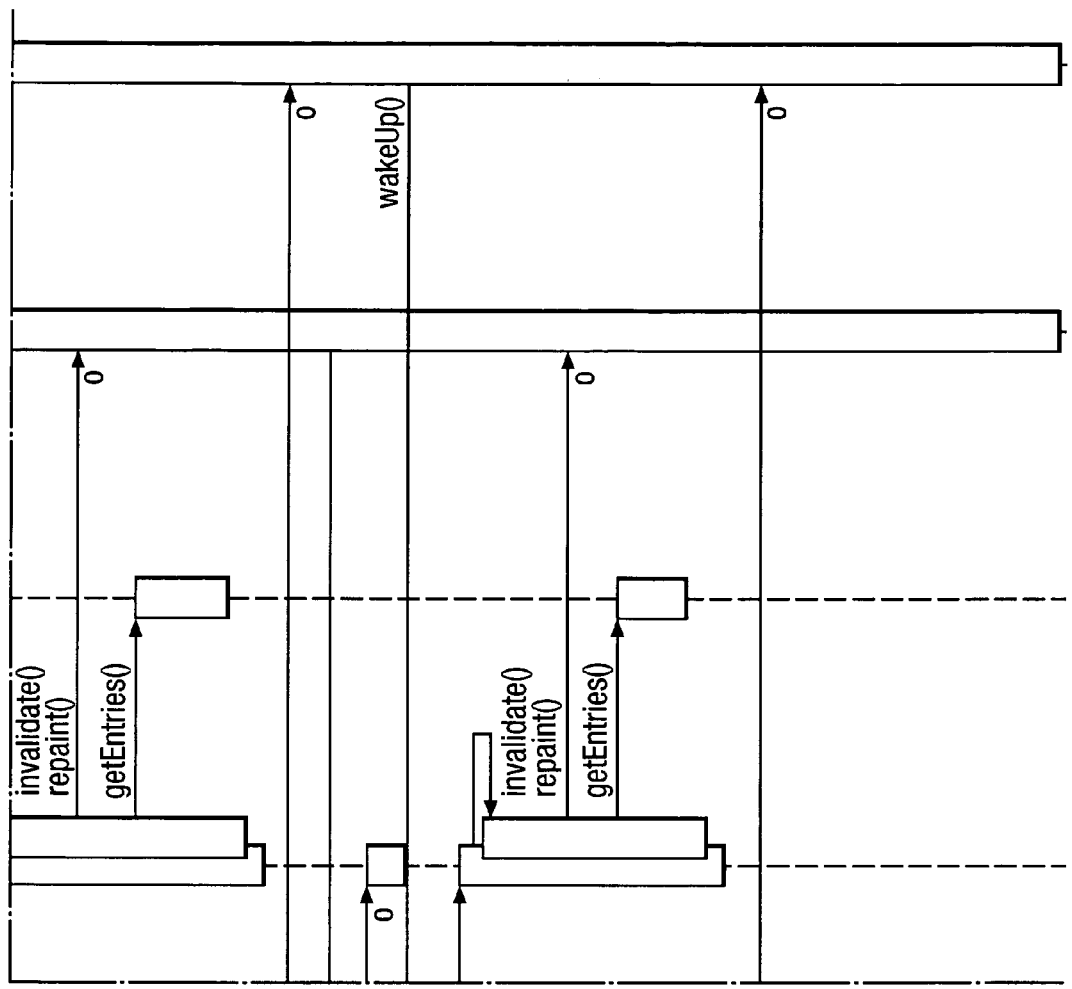

A sequence diagram for the paint operation is illustrated in FIG. 11. As illustrated, no repainting is required until the occurrence of some trigger 70 to the application 72 which, in the illustrated sequence diagram, is a key stroke 71. The application's business logic is separated from the actual updates of the user interface on the screen. When the business logic decides that at least some of the information displayed on the screen has to be updated it requests a repaint 73 from the system as illustrated by the paint thread 74.

The system then invokes the application's paint method 75 when it has the necessary resources to do so. There is no guarantee that the paint method 75 is invoked right after the application 72 requested a repaint and indeed, the application 72 may request several repaints before the next actual repaint is invoked.

As described above, the application may then update only that part of the screen which has changed.

Of course, the trigger 70 may also be some internal mechanism, such as from a clock. In that case, the part of the display showing the current time would be regularly repainted according to the trigger of the clock.

FIG. 12 illustrates how the animation of the wheel implemented on the MHP platform. The MainPane 76 represents one of the application's main objects. It controls the graphical user interface objects, one of which is the wheel. The MainPane object 76 gets the paint method 74 called from the system sometime after any of the applications objects has requested a repaint. The MainPane object 76 forwards this paint method to the stringWheel object 78 if this object needs to update the screen. The MainPane 76 also processes the incoming key strokes via the KeyHandler 80. If it is a key stroke that needs some animation on the screen (an up or down key as illustrated), the MainPane object 76 creates 81 an animation object 82 (with appropriate arguments) and passes 83 it to the animator object 84. The animator 84 is a singleton, i.e. only one instance in the application, and controls all animations 82, invoking their nextFrame methods as long as they last. Each nextFrame method returns the time (for instance in milliseconds) to wait before the next invocation of nextFrame. If this return time is negative, the animation object's stop method is invoked and the animation object is released. The animation object's nextFrame method invokes the wheels rotation method to display the next rotation frame. The animation object'S stop method invokes the wheel's reAlign method to display the last rotation frame in correct alignment.

During the rotate 88 and reAlign 90 methods of the wheel, the animation object 82 requests the entries to be displayed from the WheelData object 92. The WheelData object 92 may contain either the list of all navigation groups or the channels of a particular group. The animator object 84 may handle several animations of different types, either sequentially or in parallel. This allows the application for example to animate the wheel, while displaying the clock and moving the title. It is proposed to provide separate animations for 1) moving the wheel up or down, 2) moving strings left or right out of or into the wheel, 3) replacing the title and fading the wheel between different display screens, 4) fading in and out changes in the coloured function areas and 5) animation during the scanning process including scrolling the wheel and any animated graphics illustrating reception of data.

It should be appreciated that other processes carried out by the GUI include processes equivalent to those described above. Hence the following description and figures will not refer to the nextFrame 94 and stop 96 methods issued by the animator 84. Similarly, the get entries, repaint and paint methods will not be described again, since they are implemented in the same way as described above.

Figure 13A:
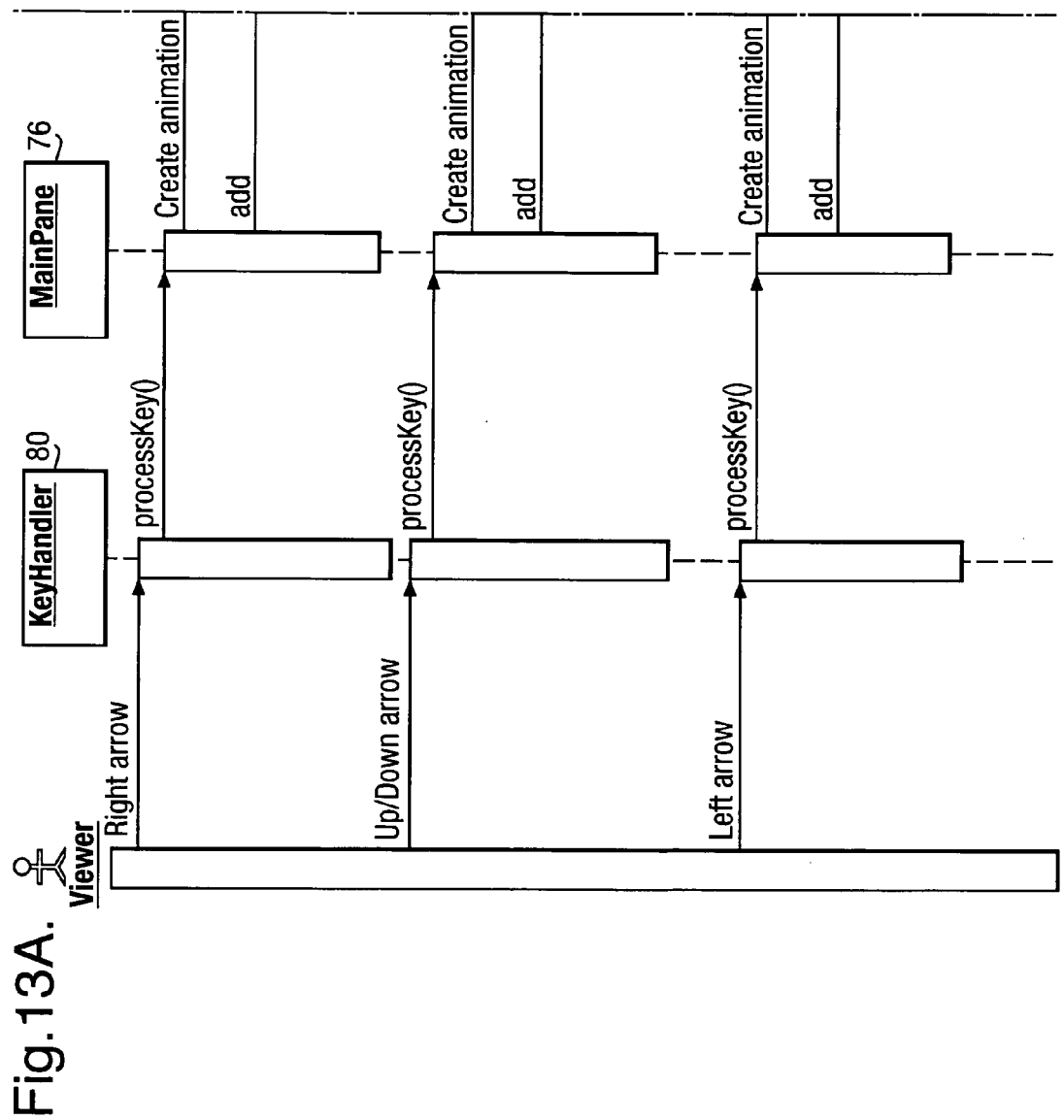
FIG. 13 illustrates a sequence diagram for moving an item within a notional wheel.
Figure 13B:
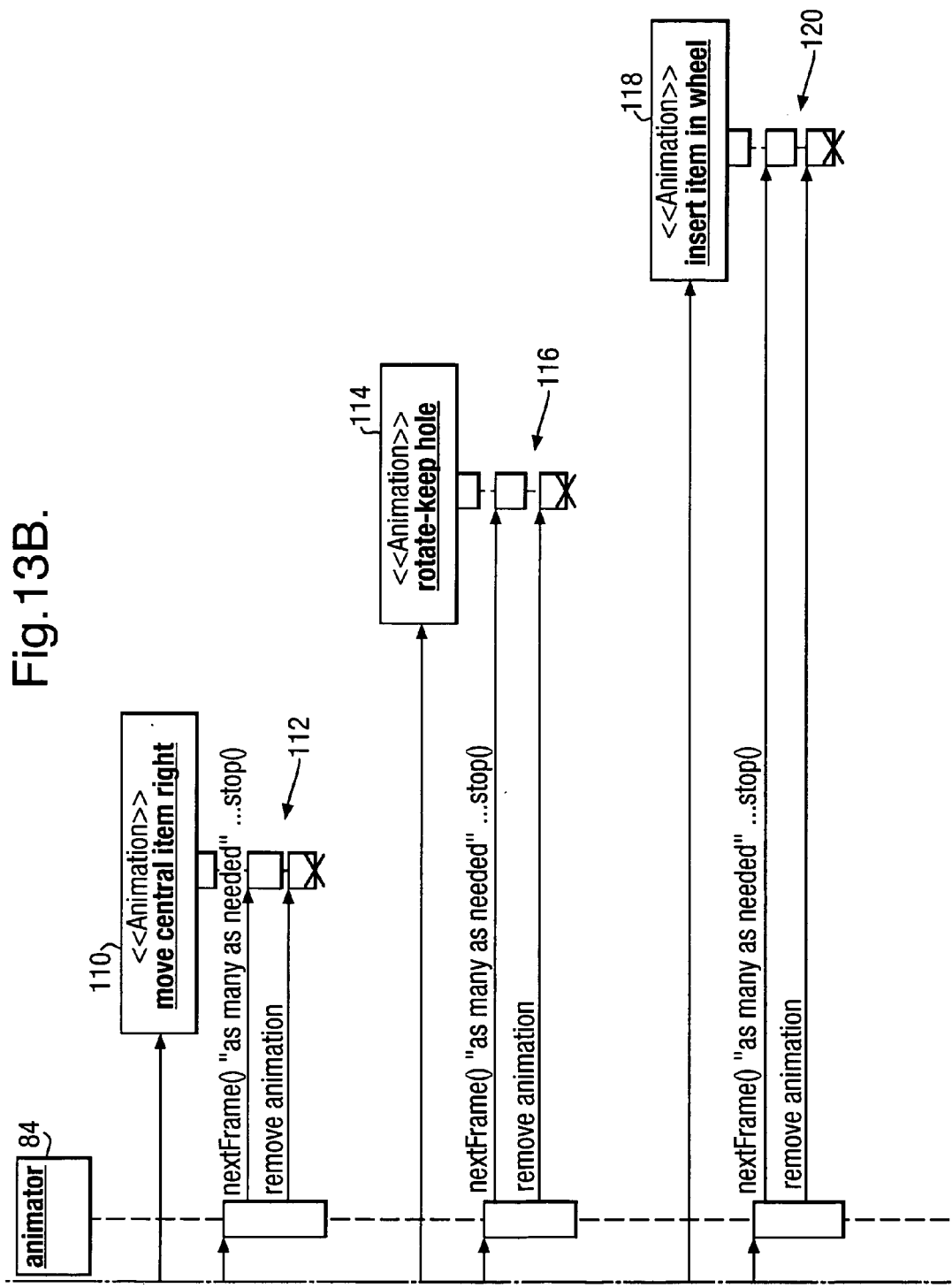

FIG. 13 illustrates as a sequence diagram how the GUI changes the order of items displayed in a wheel.

On depression of the right arrow key, the KeyHandler 80 causes the MainPane 76 to create an animation 110. It again causes the animator 84 to carry out an animation process 112 whereby the string at the predetermined position 28 is moved frame by frame to the temporary position 32. This process is equivalent to the animation described above with reference to FIG. 12.

The KeyHandler 80 then responds to the up/down keys to prompt the MainPane 76 to create an animation 114 for rotating the wheel whilst maintaining the space at the predetermined position 28.

The MainPane 76 then causes the animator 84 to carry out the animation process 116 whereby the strings of the wheel are moved frame by frame until the animation is halted and the final alignment step is taken. Again, this is equivalent to the animation process discussed above. With the wheel rotated to a position such that the space in the predetermined position 28 is at the desired position around the wheel, the user may then actuate the left arrow key.

Responsive to the left arrow key, the KeyHandler 80 causes the MainPane 76 to create an animation 118. The MainPane then causes the animator 84 to conduct the animation process 120 for moving the string from the temporary position 32 to the predetermined position 28.

Although not illustrated in this sequence diagram, the string wheel 78 and wheel data 92 are also used to update the wheel data as a result of moving the string.

Figure 14A:
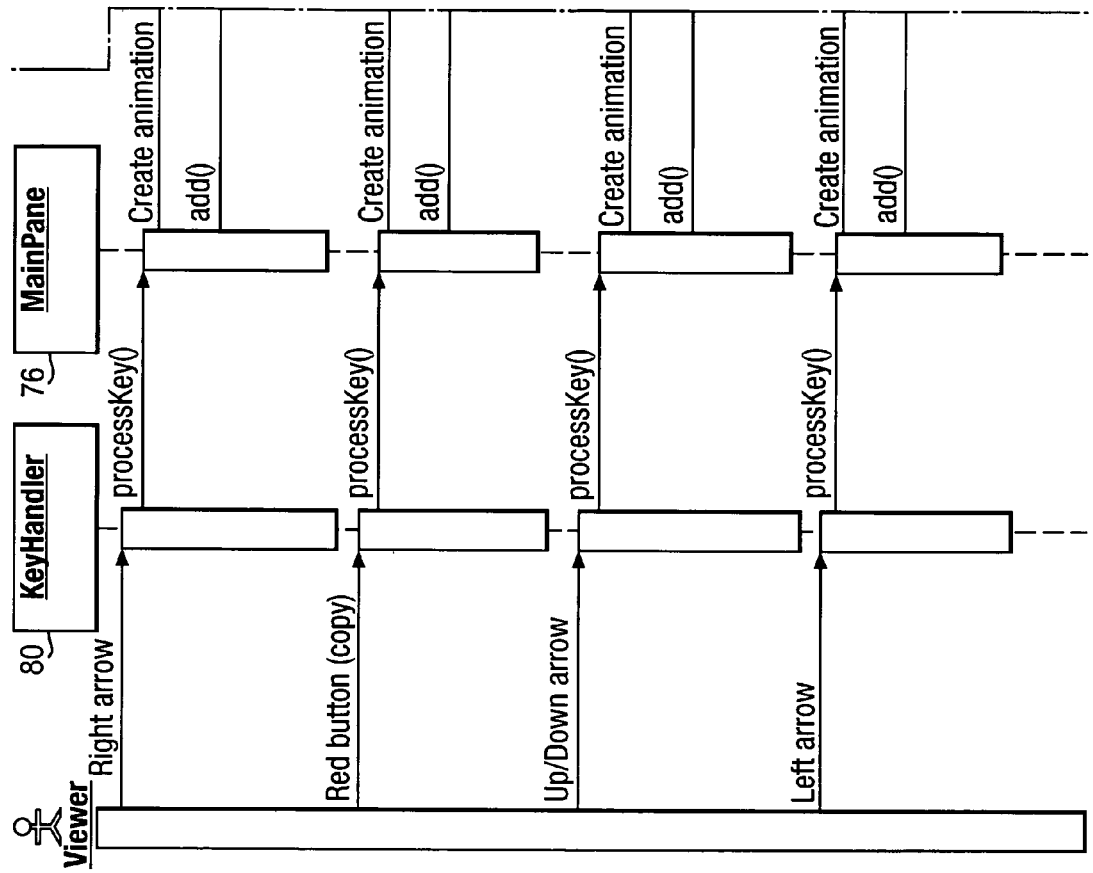
FIG. 14 illustrates a sequence diagram for moving an item from one wheel to another.
Figure 14B:
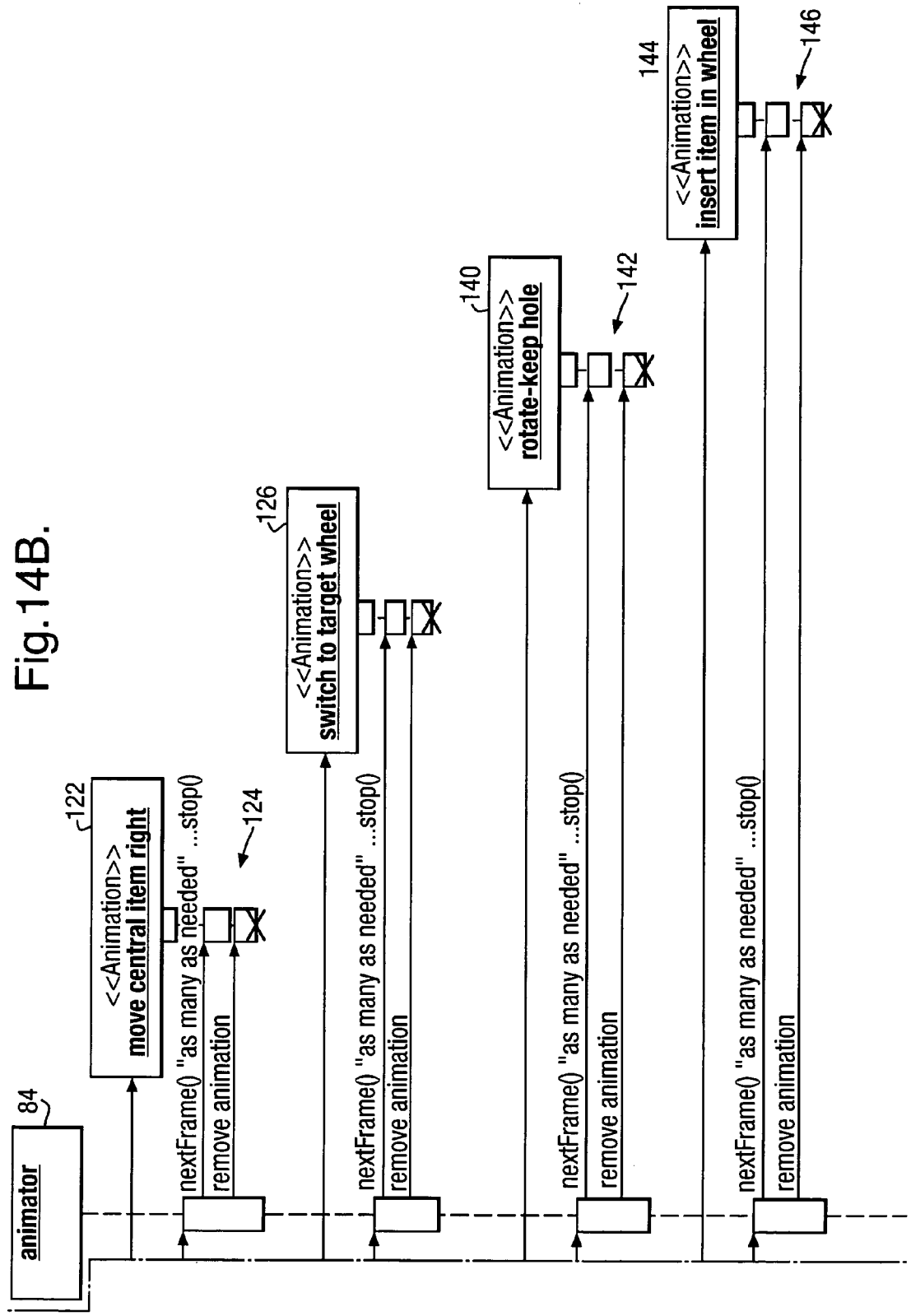

The process for copying an entry, for instance a channel name, from one group, for instance a sports bouquet, to another group, for instance the group of the users favourite channels, is illustrated in FIG. 14 by way of a sequence diagram.

Responsive to the right arrow key, the KeyHandler 80 causes the MainPane 76 to create an animation 122. The animation 122 is equivalent to the animation 110 of FIG. 13 and, under the control of the animator 84, conducts the process 124 of moving the string from the predetermined position 28 to the temporary position 32.

Responsive to a copy function key, the KeyHandler 80 causes the MainPane 76 to create an animation 126 in which the display moves to the user or target wheel. In another embodiment, it would also be possible to provide an animation to present the user with a choice of groups and a process for selecting one of the groups.

Responsive to the up/down arrow key, the KeyHandler 80 causes the MainPane 76 to create an animation 140 equivalent to animation 114 discussed above. In this way, the animator 84 may cause a process 142 for rotating the space at the predetermined position.

Finally, responsive to the left arrow key, the KeyHandler 80 causes the MainPane 76 to create an animation 144 equivalent to animation 118 discussed above such that the animator 84 may carry out a process 146 for moving the string from the temporary position 32 into the predetermined position 28.

Figure 15A:
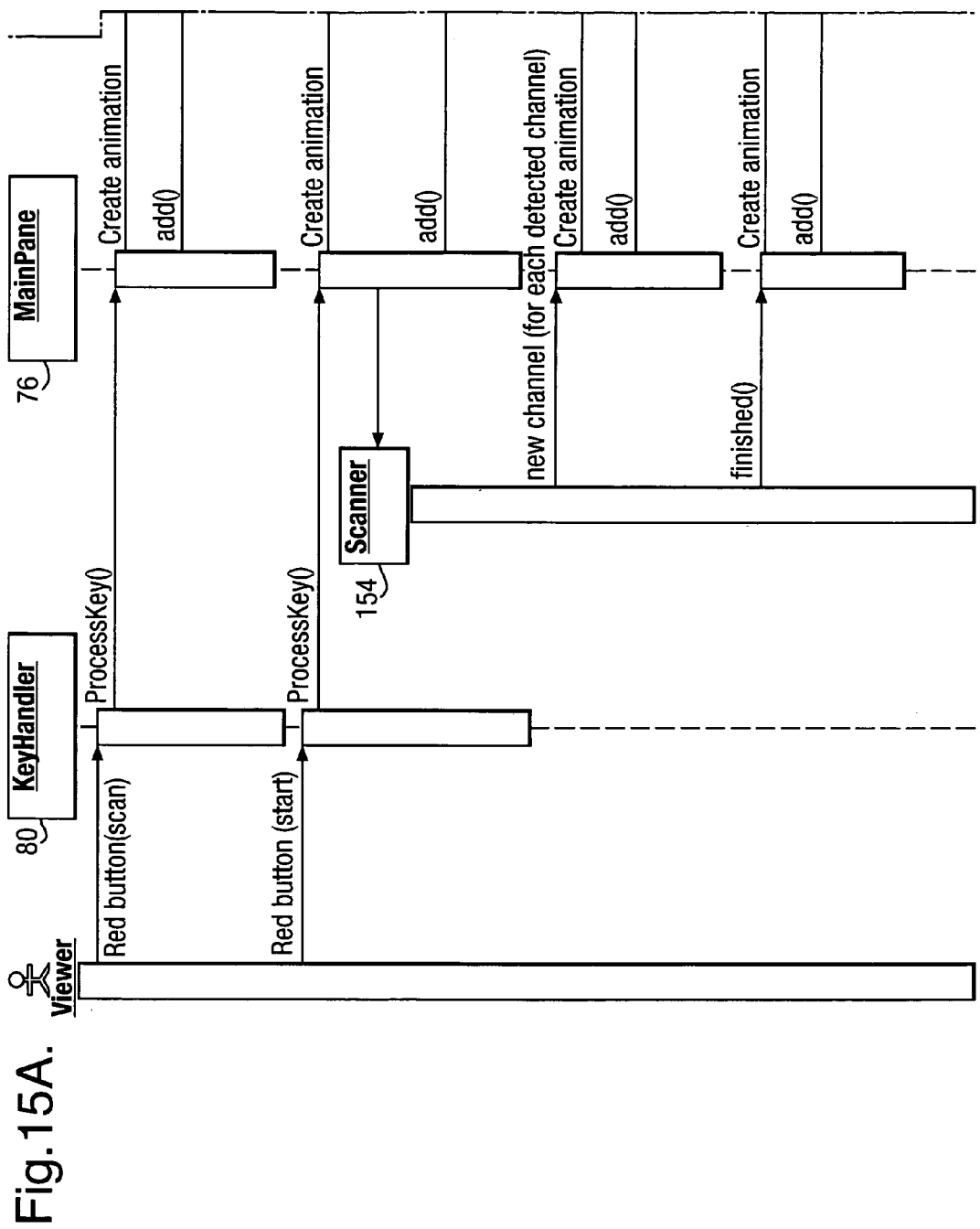
FIG. 15 illustrates a sequence diagram for the scanning process.
Figure 15B:
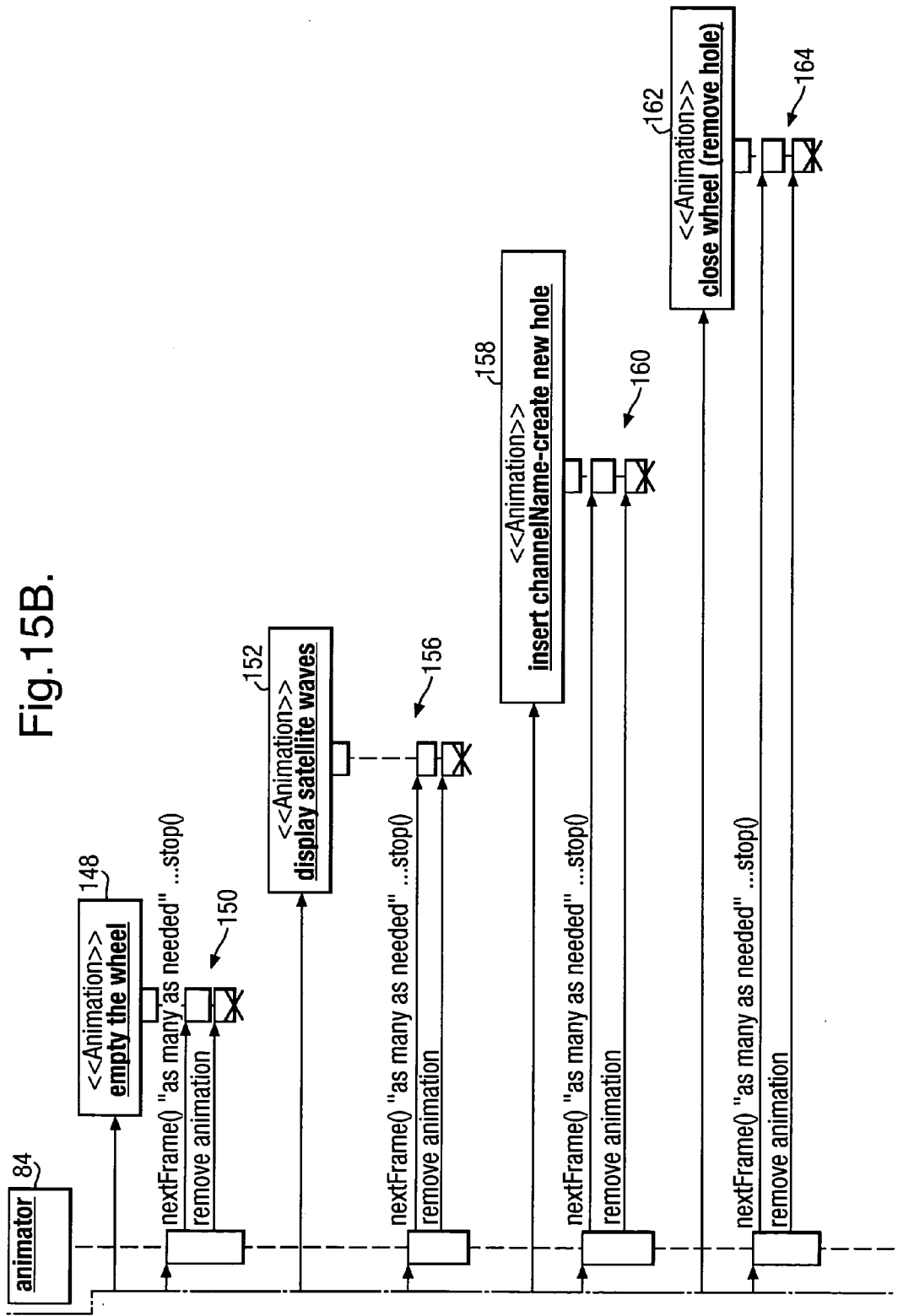

FIG. 15 illustrates, as a sequence diagram, the process of scanning the available broadcast services. In this process, the application uses the MHP platform and instructs the tuner to scan for available channels. The user initiates this by first actuating the scan function key. Responsive to this key, the KeyHandler 80 causes the MainPane 76 to create an animation 148. The animator 84 then uses the animation 148 to conduct a process 150 whereby an empty wheel is displayed.

The user may then start the process by actuating the start function key. Responsive to this key, the KeyHandler 80 causes the MainPane 76 to create an animation 152. This animation is merely decorative and indicates to the user by means of a moving image that scanning is taking place. The MainPane 76 then initiates (creates) a scanner object 154 which runs in the background and triggers the MainPane 76 every time the tuner detects a new channel.

The MainPane 76 causes the animator 84 to continue running the animation 152 by the process 156 until the complete scanning process is over.

In the meantime, the scanner triggers the MainPane 76 whenever a new channel is detected. In response to this, the MainPane 76 creates an animation 158 for displaying the new channel name and inserting this into the wheel. The MainPane 76 causes the animator 84 to conduct the animation process 60. This process is repeated until the whole frequency range has been scanned. Alternatively, although not illustrated, the process could be halted by actuation of the stop function key.

Once the scanner 154 has scanned the whole frequency range, it invokes the finished method 164 by which the MainPane 76 creates an animation 162 and the animator 84 causes the wheel to be closed and any space in the predetermined position 28 to be filled with a string.

Figure 16A:
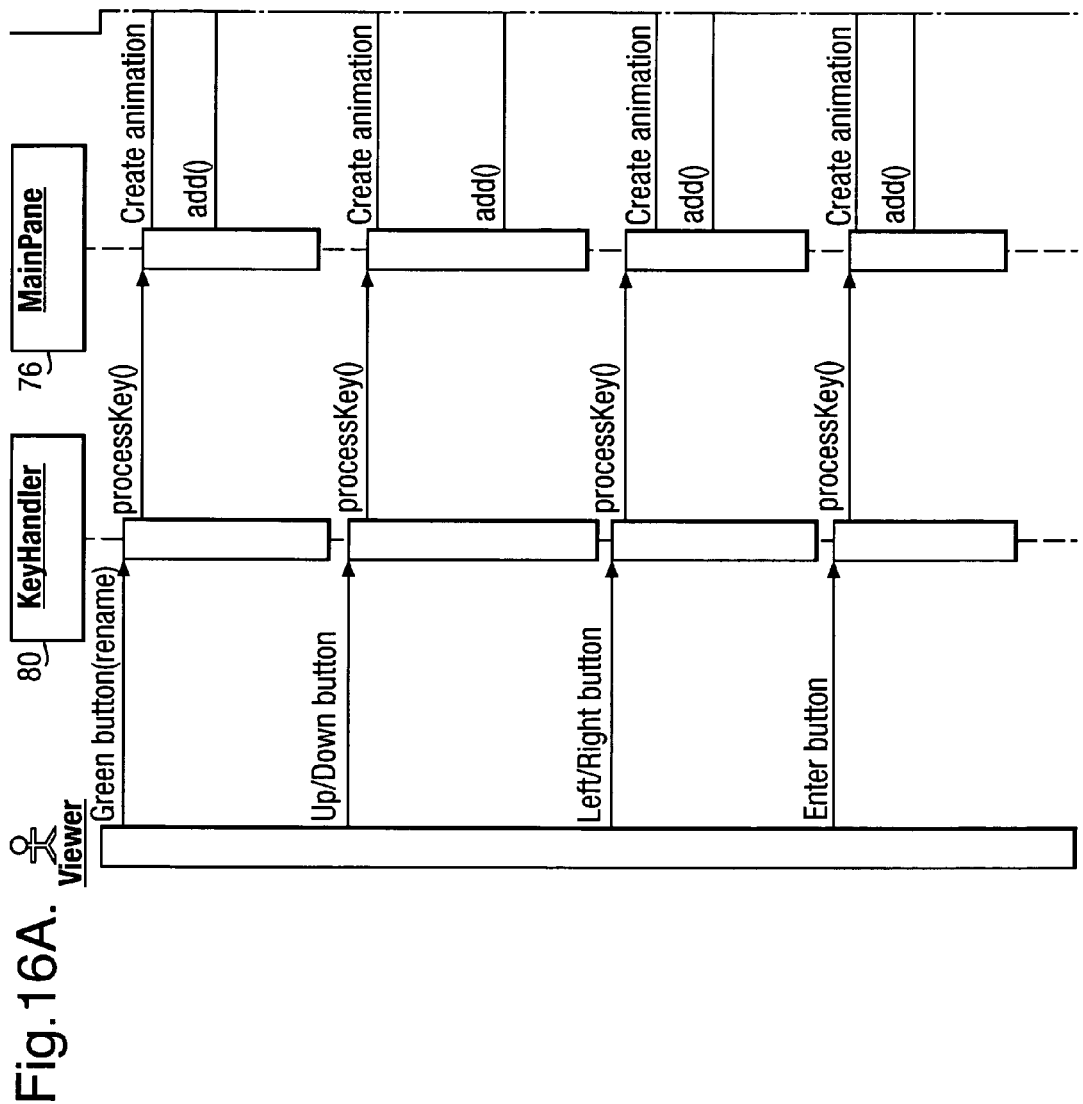
FIG. 16 illustrates a sequence diagram for the rename process.
Figure 16B:
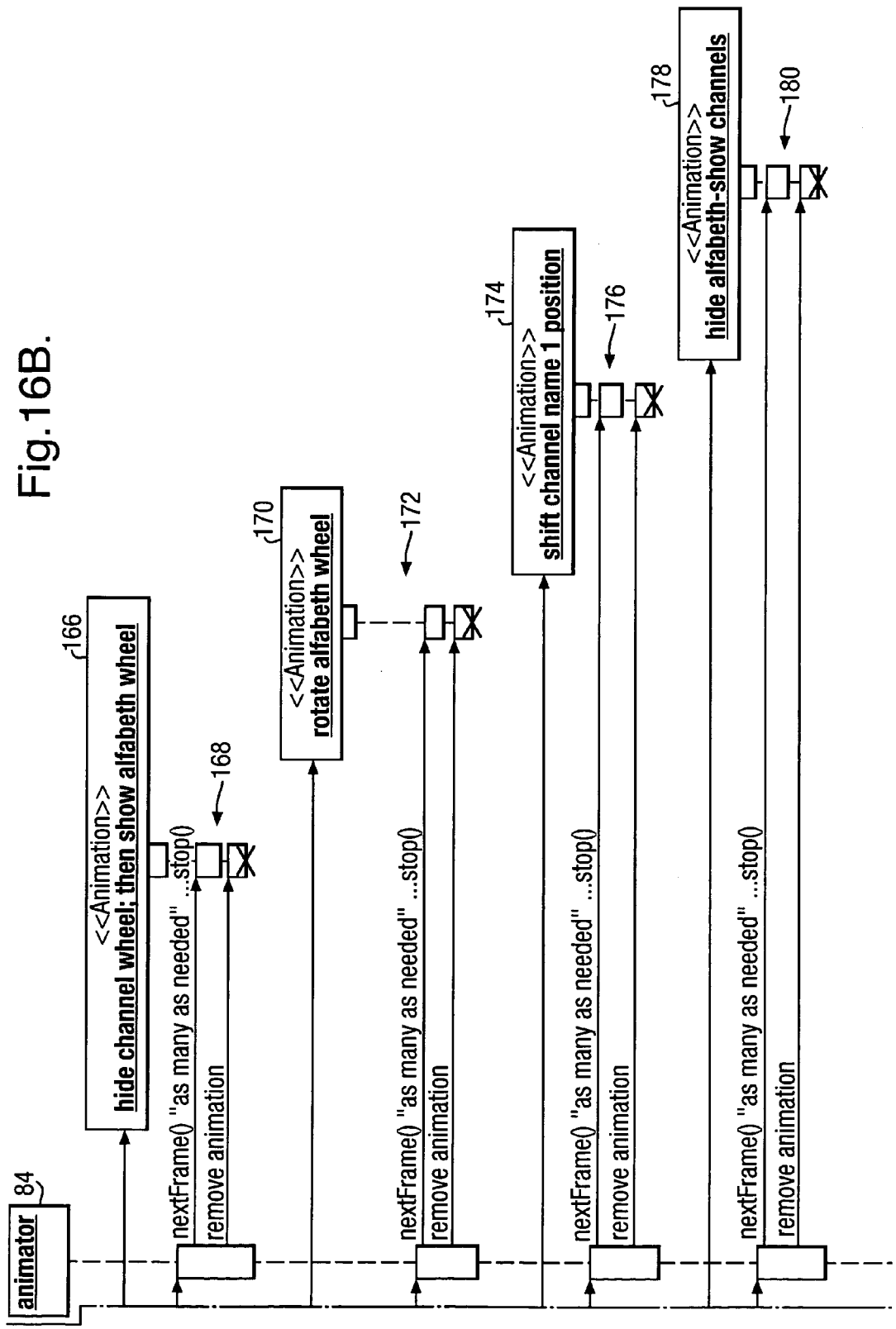

FIG. 16 illustrates, as a sequence diagram, the process by which the wheel may be used as a virtual keyboard.

Upon actuation of the rename function key, the KeyHandler 80 causes the MainPane 76 to create an animation 166. By way of the animator 84, a process 168 is conducted whereby the wheel of strings is replaced by a wheel showing the alphabet with the central character being the same as the first character of the string to be changed and positioned on top of that first character.

Responsive to an up/down button, the KeyHandler 80 causes the MainPane 76 to create an animation 170 which, with the animator 84, rotates the wheel of characters up or down in a process 172 equivalent to the processes described above for rotating the wheel.

The user may also actuate left or right buttons which prompt the KeyHandler 80 to cause the MainPane 76 to create an animation 174 for shifting the character string left or right by means of a process 176. In fact, this process may move either the wheel left or right or the character string left or right.

Finally, upon actuation of the enter function key, the KeyHandler 80 causes the MainPane 76 to create an animation 178 which, together with the animator 84 carries out a process of returning to the channel wheel showing the renamed character string.

We claim:

1. An MHP television device including a GUI application and a user input wherein the GUI application maintains at least one notional wheel to which activities and strings for representing the activities may be assigned and generates an image for display, the image including an edge of the notional wheel on which a predetermined number of the strings are arranged for display and further including function areas corresponding to predetermined functions, the GUI application being responsive to the user input to initiate the functions and also to rotate the notional wheel so as to display different strings and to select any activity represented by a string on the notional wheel at a predetermined position of the image, wherein the GUI application generates an edit image including the edge of a notional wheel in response to selection of an edit function, and wherein the edit image includes a re-name function area, and the GUI application is responsive to the re-name function to generate a re-name image for display, the image including the edge of a notional wheel on which the string at the predetermined position of the notional wheel of the edit image is retained at the predetermined position and characters appear at other positions of the notional wheel, the GUI application being responsive to the user input to rotate the notional wheel and move the string within the predetermined position such that each character of the string can be changed in turn by rotating the notional wheel.

2. An MHP television device according to claim 1 comprising one of a set top box and an integrated television.

3. An MHP television device according to claim 1 wherein the GUI application stores activities and their respective strings in groups, the strings of each group being assigned to a respective notional wheel and being available for display on the edge of the respective notional wheel and wherein the activities include groups, such that selection of a group causes the GUI application to generate an image including the edge of a notional wheel with the strings of the selected group.

4. An MHP television device according to claim 1 wherein the activities include television channels and the image includes a portion adjacent the predetermined position for displaying an internally assigned channel number corresponding to the channel currently represented by the string at the predetermined position.

5. An MHP television device according to claim 1 wherein the edit image includes a hide function area and the GUI application is responsive to the hide function such that the string currently at the predetermined position may be hidden or unhidden from display.

6. An MHP television device according to claim 1 wherein the edit image includes a lock function area and the GUI application is responsive to the lock function such that the activity represented by the string currently at the predetermined position may be made available or unavailable for selection.

7. An MHP television device according to claim 1 wherein responsive to the user input, the GUI application moves the string at the predetermined position to a temporary position so as to leave a space at the predetermined position or moves the string from the temporary position to the predetermined position, rotation of the notional wheel maintaining the space at the predetermined position such that a string may be moved out of one position on the notional wheel and back in to a different position.

8. An MHP television device according to claim 7 wherein when a string is at the temporary position, the GUI application causes a copy function area to be displayed on the edit image and, responsive to selection of the copy function, the GUI application allows selection of other notional wheels, each with a space at the predetermined position, thereby allowing the insertion of the string from the temporary position into the other notional wheels.

9. An MHP television device according to claim 1 wherein responsive to selection of a scan function, the GUI application generates a scan image including the edge of a notional wheel and a start function area, the GUI application being responsive to the start function area to initiate scanning of all available activities and to assign all of the detected activities and their respective strings to the notional wheel.

10. An MHP television device according to claim 1 wherein the GUI application only conducts a repaint operation to update an image for display upon receipt of an appropriate trigger, the GUI application then determining which part of the image requires an update and conducting a repaint operation for that part.

11. An MHP television device according to claim 1 wherein the GUI application comprises a wheel data object for maintaining a list of activities in relation to the notional wheels and a string wheel object for providing data representing the displayed edge of the current notional wheel.

12. An MHP television device according to claim 11 wherein the GUI application further comprises a main pane object responsive to the user input and an animator object wherein, responsive to the user input to rotate a notional wheel, the main pane creates an animation object for rotating the wheel and the animator object controls the animation object to change the data of the string wheel object on the basis of the data in the wheel data object.

13. An MHP television device according to claim 12 wherein each time the animator object controls the animation object to conduct a process to produce the next frame, the process returns the time to wait for the animation object to produce the following frame such that when a predetermined number of animations have been conducted for rotating the notional wheel, the animation object conducts a process to align the wheel relative to the predetermined position.

14. A GUI application for use with an MHP television device and a user input wherein the GUI application maintains at least one notional wheel to which activities and strings for representing the activities may be assigned and generates an image for display, the image including an edge of the notional wheel on which a predetermined number of the strings are arranged for display and further including function areas corresponding to predetermined functions, the GUI application being responsive to the user input to initiate the functions and also to rotate the notional wheel so as to display different strings and to select any activity represented by a string on the notional wheel at a predetermined position of the image, wherein the GUI application generates an edit image including the edge of a notional wheel in response to selection of an edit function, and wherein the edit image includes a re-name function area, responsive to the re-name function generating a re-name image for display, the image including the edge of a notional wheel on which the string at the predetermined position of the notional wheel of the edit image is retained at the predetermined position and characters appear at other positions of the notional wheel, the GUI application being responsive to the user input rotating the notional wheel and moving the string within the predetermined position such that each character of the string can be changed in turn by rotating the notional wheel.

15. A GUI application according to claim 14 wherein the GUI application stores activities and their respective strings in groups, the strings of each group being assigned to a respective notional wheel and being available for display on the edge of the respective notional wheel and wherein the activities include groups, such that selection of a group causes the GUI application to generate an image including the edge of a notional wheel with the strings of the selected group.

16. A method of providing an MHP television device including a user input with a graphical user interface comprising:

maintaining at least one notional wheel to which activities and strings for representing the activities may be assigned, generating an image for display, the image including an edge of the notional wheel on which a predetermined number of the strings are arranged for display and further including function areas corresponding to predetermined functions, and in response to the user input, initiating the functions and also rotating the notional wheel so as to display different strings and selecting any activity represented by a string on the notional wheel at a predetermined position of the image, in response to selection of an edit function, generating an edit image including the edge of a notional wheel, the edit image including a re-name function area, and in response to the re-name function, generating a re-name function area, and generating a re-name image for display, the image including the edge of a notional wheel on which the string at the predetermined position of the notional wheel of the edit image is retained at the predetermined position and characters appear at other positions of the notional wheel; and in response to the user input, rotating the notional wheel and moving the string within the predetermined position such that each character of the string can be changed in turn by rotating the notional wheel.

17. A computer readable storage medium having recorded thereon code components that, when loaded on an MHP television device and executed will cause that MHP television device to operate according to claim 16.

* * * * *